United States Patent
Nakao

(10) Patent No.: US 9,696,829 B2
(45) Date of Patent: Jul. 4, 2017

(54) PORTABLE TERMINAL, INFORMATION DISPLAY CONTROL METHOD, AND INFORMATION DISPLAY CONTROL SYSTEM

(71) Applicant: PANASONIC INTELLECTUAL PROPERTY CORPORATION OF AMERICA, Torrance, CA (US)

(72) Inventor: Masatoshi Nakao, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/416,287

(22) PCT Filed: Apr. 24, 2013

(86) PCT No.: PCT/JP2013/002791
§ 371 (c)(1),
(2) Date: Jan. 22, 2015

(87) PCT Pub. No.: WO2014/017002
PCT Pub. Date: Jan. 30, 2014

(65) Prior Publication Data
US 2015/0169093 A1    Jun. 18, 2015

(30) Foreign Application Priority Data
Jul. 24, 2012  (JP) .................................. 2012-163929

(51) Int. Cl.
*G06F 3/041* (2006.01)
*G06F 3/0488* (2013.01)
*H04M 1/725* (2006.01)

(52) U.S. Cl.
CPC ............ *G06F 3/041* (2013.01); *G06F 3/0488* (2013.01); *H04M 1/72522* (2013.01); *G06F 2203/04108* (2013.01)

(58) Field of Classification Search
CPC ................... G06F 3/041; G06F 3/0488; G06F 2203/04108; H04M 1/72522
(Continued)

(56) References Cited

U.S. PATENT DOCUMENTS 9,035,888 B1 * 5/2015 DeLatorre ........... G06F 3/04886
345/173
2011/0124378 A1   5/2011 Asano
(Continued)

FOREIGN PATENT DOCUMENTS

JP    2003-044223    2/2003
JP    2008-250948    10/2008
(Continued)

OTHER PUBLICATIONS

International Search Report in International Patent Application PCT/JP2013/002791, mail date is Aug. 6, 2013.

*Primary Examiner* — Towfiq Elahi
(74) *Attorney, Agent, or Firm* — Greenblum & Bernstein, P.L.C.

(57) ABSTRACT

A portable terminal is a portable terminal which displays delivered content on a screen, and includes a proximity detection unit that detects proximity of a physical object to the screen and outputs a proximity detection signal, an information request unit that requests additional information for an object of content that is displayed at a proximity corresponding position which is a position on the screen corresponding to the physical object of which the proximity is detected, based on the proximity detection signal, and a display control unit that displays additional information for an object of content delivered in response to a request from
(Continued)

the information request unit, in the vicinity of the proximity corresponding position of the screen.

19 Claims, 12 Drawing Sheets

(58) Field of Classification Search
USPC .......................................................... 345/173
See application file for complete search history.

(56) References Cited

U.S. PATENT DOCUMENTS

| | | | |
|---|---|---|---|
| 2011/0164058 A1* | 7/2011 | Lemay | G06F 3/0488 345/651 |
| 2012/0105331 A1 | 5/2012 | Nomoto | |
| 2012/0176398 A1 | 7/2012 | Takaoka et al. | |
| 2013/0111386 A1* | 5/2013 | Rhodes | G06F 9/5077 715/771 |
| 2014/0220956 A1 | 8/2014 | Asano | |
| 2014/0340332 A1 | 11/2014 | Lemay | |

FOREIGN PATENT DOCUMENTS

| | | |
|---|---|---|
| JP | 2010-009287 | 1/2010 |
| JP | 2012-094008 | 5/2012 |
| JP | 2012-133523 | 7/2012 |

* cited by examiner

PORTABLE TERMINAL, INFORMATION DISPLAY CONTROL METHOD, AND INFORMATION DISPLAY CONTROL SYSTEM

TECHNICAL FIELD

The present invention relates to a portable terminal, an information display control method, and an information display control system, which support an input operation through a touch panel.

BACKGROUND ART

A touch panel capable of providing an intuitive user interface for a user has been widely used as a device that receives an input operation of an electronic device including a mobile phone or smart phone. The touch panel provides the user for performing on the same screen to receive an input operation for a screen of a display unit (for example, a liquid crystal display (LCD) or an organic electroluminescence (EL) display) provided in the electronic device, and to display the operation execution result of the input operation.

Also, recently, a portable electronic device on which a touch panel capable of detecting the proximity of a physical object (for example, the user's finger or a stylus pen) is mounted has been known (for example, see Patent Literature 1). When a distance D between a physical object moving close to a display unit and a display surface of the display unit is shorter than a first distance dl, the portable electronic device disclosed in Patent Literature 1 enlarges and displays an image corresponding to an area displayed in a predetermined range of the display unit, on the display unit. Here, the predetermined range of the display unit is, for example, an area adjacent to an area including a specific position on the display unit. Only when the user moves the finger or the stylus pen close to the display unit, the portable electronic device can allow an area to be enlarged to be freely selected.

CITATION LIST

Patent Literature

Patent Literature 1: JP-A-2012-94008

SUMMARY OF INVENTION

Technical Problem

However, in Patent Literature 1, it is assumed that the image to be enlarged and displayed when the physical object (for example, the user's finger) is close to the display unit is a virtual keyboard in a QWERTY arrangement, numeric keys or the like, but for example, map content of a map application is not considered. In a map application in existing electronic devices (for example, mobile phones), for example, in order to switch a wide area map to a detailed map so as to enlarge the details of map content, it is necessary to increase a scale by using, for example, a pinch operation.

Further, in a map application in an existing electronic device, if the scale of the map content is enlarged, the name of an object (for example, facilities such as a station or a building) displayed on the screen is displayed. However, it is not possible to additionally display service information which is useful for the user such as event information or reservation information for the object at the moment (for example, restaurant) on the map content. When the user wants to actually check the service information such as event information or reservation information of the object (restaurant) displayed on the map content, the user needs to perform an operation for accessing the site of the restaurant by a touch operation, and there is a problem of time being taken for the user's operation.

The present invention has been devised in view of the circumstances described above, a purpose of the present invention is to provide a portable terminal, an information display control method and an information display control system, which are capable of displaying additional information for an object of content that is displayed at a position on a screen to which the proximity of a physical object is detected, in the vicinity of the object, thereby improving user operability.

Solution to Problem

An aspect of the present invention provides a portable terminal which displays delivered content on a screen, the portable terminal including: a proximity detection unit that detects proximity of a physical object to the screen and outputs a proximity detection signal; an information request unit that requests additional information for an object of content that is displayed at a proximity corresponding position which is a position on the screen corresponding to the physical object of which the proximity is detected, based on the proximity detection signal; and a display control unit that displays the additional information for the object of the delivered content, in the vicinity of the proximity corresponding position of the screen, in response to a request from the information request unit.

According to the configuration, even if contact with the screen is not detected, the additional information for the object at the proximity corresponding position is requested from the server device at the time when the proximity of the physical object is detected. Thus it is possible to display the additional information for the object of content that is displayed at a position on a screen to which the proximity of the physical object is detected, in the vicinity of the position, thereby improving user operability.

Another aspect of the present invention provides an information display control system comprising a portable terminal which displays delivered content on a screen and a server device which delivers the content corresponding to a request from the portable terminal to the portable terminal, wherein the portable terminal includes: a proximity detection unit that detects proximity of a physical object to the screen and outputs a proximity detection signal; an information request unit that requests additional information for an object of the content that is displayed at a proximity corresponding position which is a position on the screen corresponding to the physical object of which the proximity is detected, based on the proximity detection signal; and a display control unit that displays the additional information for the object delivered from the server device in response to a request from the information request unit, in the vicinity of the proximity corresponding position of the screen, and wherein the server device includes: a content storage unit that stores the content; an additional information storage unit that stores additional information for any object in the content; an additional information control unit that acquires additional information for the object in response to the request from the information request unit, from the additional information storage unit; and an information delivery unit that delivers the acquired additional information for the object to the portable terminal.

According to the system, even if contact with the screen is not detected, the portable terminal requests the additional information for the object at the proximity corresponding position from the server device at the time when the proximity of the physical object is detected, and the server device acquires the additional information for the object in response to the request from the portable terminal from the additional information storage unit and delivers the information. Thus it is possible to display the additional information for the object of content that is displayed at a position on a screen to which the proximity of the physical object is detected, in the vicinity of the position, thereby improving user operability.

Another aspect of the present invention provides an information display control method in a portable terminal which displays delivered content on a screen and a server device which delivers the content corresponding to a request from the portable terminal to the portable terminal, the method including: a step of detecting proximity of a physical object to the screen and outputting a proximity detection signal; a step of requesting additional information for an object of the content that is displayed at a proximity corresponding position which is a position on the screen corresponding to the physical object of which the proximity is detected, based on the proximity detection signal; a step of acquiring additional information for the object in response to the request, from an additional information storage unit that stores additional information for any object in the content, a step of delivering the acquired additional information for the object to the portable terminal, and a step of displaying additional information for the object delivered from the server device in response to the request, in the vicinity of the proximity corresponding position of the screen.

According to the method, even if contact with the screen is not detected, the portable terminal requests the additional information for the object at the proximity corresponding position from the server device at the time when the proximity of the physical object is detected, and the server device acquires the additional information for the object in response to the request from the portable terminal from the additional information storage unit and delivers the information. Thus it is possible to display the additional information for the object of content that is displayed at a position on a screen to which the proximity of the physical object is detected, in the vicinity of the position, thereby improving user operability.

Advantageous Effects of Invention

According to the present invention, it is possible to display additional information for an object of content that is displayed at a position on a screen to which the proximity of the physical object is detected, in the vicinity of the position, thereby improving user operability.

DESCRIPTION OF EMBODIMENTS

Description of Problem which is Premise of Embodiments

Figure 12:
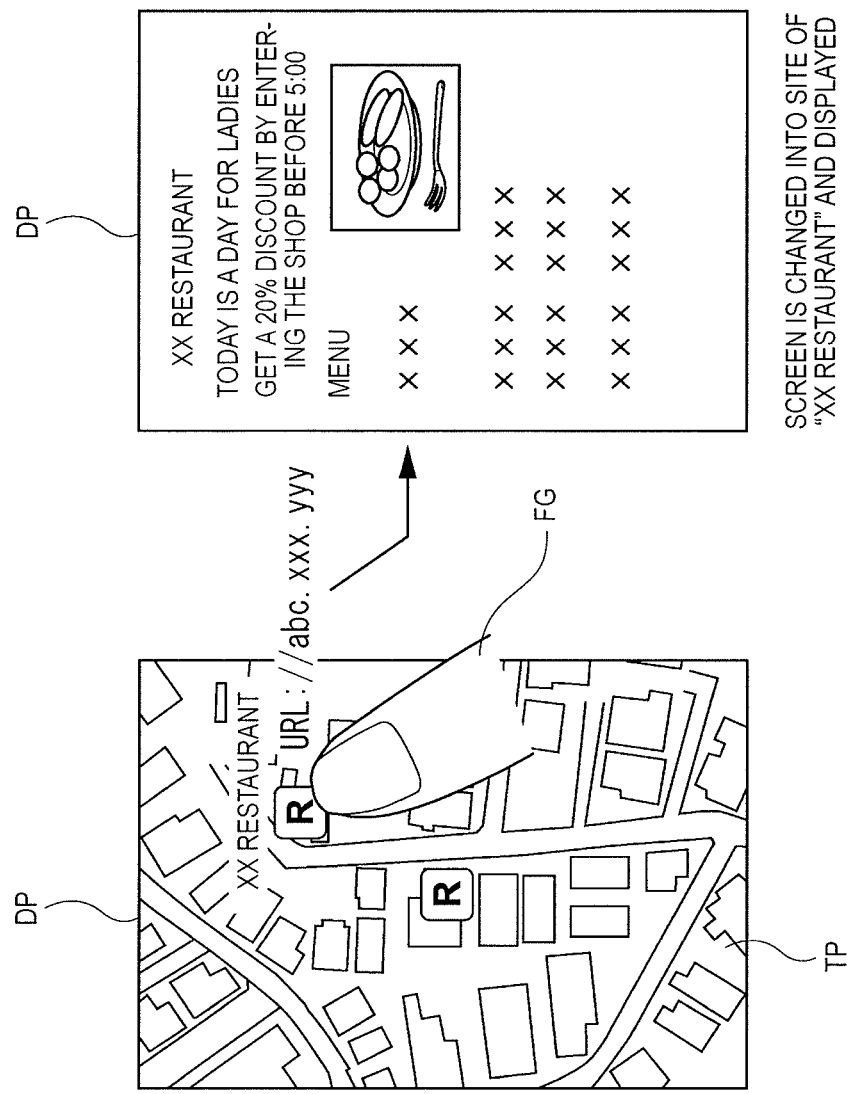
FIG. 12 is a diagram describing a problem which is the premise of respective embodiments.

First, a problem which is the premise of the embodiments will be described with reference to FIG. 12, before describing the specific respective embodiments of a portable terminal, an information display control method and an information display control system according to the present invention. FIG. 12 is a diagram describing a problem which is the premise of the respective embodiments. A screen DP on the left side of FIG. 12 is a diagram illustrating an aspect in which map content of a map application is displayed on the screen DP. The screen DP on the right side of FIG. 12 is a diagram illustrating an aspect in which the site of "XX restaurant" is displayed on the screen DP.

As illustrated in the left side of FIG. 12, for example, as the scale of the map content is increased by a pinch operation, the existing map application can display specific details of a map and the name (for example, "XX restaurant") of a specific object (facility) on the map content. In the existing map application, the map content data and at least name data of a specific object are associated in advance with each other and stored in an external device for delivering map content data (for example, a management server storing the map content).

However, if related information other than, for example, the name of a specific object on the map content is not associated in advance with the data of the map content, it is not possible for the existing map application to display the related information of the specific object. For example, even if the existing map application can display the name (for example, "XX restaurant") which is associated in advance with the specific object on the map content, it is not possible for the existing map application to display additional information such as details of special offers of the restaurant at the moment or whether or not a reservation can be made at the restaurant at the moment, which is not associated in advance, in the vicinity of the position at which "XX restaurant" is displayed on the map content.

Here, in order to display the additional information for the "XX restaurant" described above on the map content by using the existing technology, it is necessary to configure and display link information (for example, URL "http://abc.xxx.yyy") for allowing access to the site of "XX restaurant", in the vicinity of the position at which "XX restaurant" is displayed on the map content, for example. For example, when a finger FG touches an URL displayed in the vicinity of "XX restaurant", the screen of the map application is switched to the screen of the website (site) of "XX restaurant" which is managed and operated by "XX restaurant", as illustrated in the right side of FIG. 12.

The user checks additional information such as details of special offers from "XX restaurant" at the moment or whether or not a reservation can be made at the restaurant on the screen of the website of "XX restaurant". In other words, in the map application, when, for example, a plurality of restaurants are displayed and the user checks additional information for each of the restaurants, the screen of the map application and the screen of the site of each restaurant need to be switched one by one. Therefore, there is a problem in that the user's operation becomes complicated and the operation is not efficient.

(Description of Embodiments)

Hereinafter, respective embodiments of a portable terminal, an information display control method, and an information display control system according to the present invention will be described with reference to the drawings. The portable terminal according to the present invention includes a display unit that displays data of content (for example, map content) used in an application applicable in the portable terminal (for example, map application) on a screen. The portable terminal is, for example, a mobile phone, a smart phone, a tablet terminal, a digital still camera, a personal digital assistant (PDA) or an electronic book terminal.

The map content used in the map application is delivered from an external server device which stores the map content data, in response to an input operation of the user who operates the portable terminal.

In addition, the present invention can be realized as a portable terminal which is a device, a program for executing respective operations (steps) performed by the portable terminal by using the portable terminal as a computer, and an information processing method including respective operations (steps) performed by the portable terminal, with respect to a portable terminal. Further, the present invention can be realized as an information display control system including a portable terminal and a server device, or an information display control method including respective operations (steps) which are performed by the portable terminal and the server device. In other words, the present invention can be represented as any category of a device, a method, a program, and a system.

(Description of Terms Required for Respective Embodiments)

The following description will be made by using the user's finger (for example, an index finger) as an example of a physical object which moves close to or comes into contact with the touch panel, but the physical object is not limited to the user's finger and may be a conductive stylus (stylus pen). Further, the physical object which moves close to or comes into contact with the touch panel is not particularly limited, as long as the proximity and touch (contact) of the physical object to the touch panel can be detected, depending on the structure and the detection method of a touch panel.

Two axes representing the horizontal plane of the touch panel are set to an x axis and a y axis, and an axis representing a direction (height direction) perpendicular to the horizontal plane on the touch panel is set to a z axis. Further, in the following description, "touch coordinates" represent coordinates (x, y) for identifying a position on the horizontal plane of the touch panel when the touch panel detects the touch (contact) of the finger, and "proximity coordinates" represent coordinates (x, y, z) for identifying a position within a proximity detection-possible area in a space, when the touch panel detects the proximity of the finger. A z coordinate value of the proximity coordinates represents a height by which the finger is separated from the horizontal plane of the touch panel in a space. Further, in the following description, the position on the screen (the position on the horizontal plane of the touch panel) corresponding to the position of the finger present in a space in which proximity of the finger is detected is defined as "proximity corresponding position".

Further, in the following description, an operation of holding up the finger at a position within the proximity detection-possible area in a space which is separated from the horizontal plane of the touch panel in a direction away therefrom is defined as "hover operation", and an operation of sliding (moving) the finger approximately parallel to the horizontal plane of the touch panel from a position in a space at which the finger is held up by the hover operation is defined as "hover slide operation". Accordingly, a finger operation of directly touching a specific position on the horizontal plane of the touch panel is not "hover operation", but is "touch operation". Further, a finger's operation of sliding (moving) on the same horizontal plane while touching (contacting) the horizontal plane of the touch panel is defined as "touch slide operation".

In addition, since a distance between the finger and the plane on the touch panel is inversely proportional to the electrostatic capacitance value which is detected by the touch panel, it is preferable that the electrostatic capacitance values correspond to a range of the electrostatic capacitance values detectable by the touch panel, in order to detect the hover operation or the hover slide operation.

Further, in the following description, in the map application, information related to the name of any object (for example, facility) in the map content and the details of the object at the time when the object is displayed on the screen is defined as "additional information". In addition, the details of the additional information will be described later with reference to FIG. 2.

First Embodiment

Figure 3:
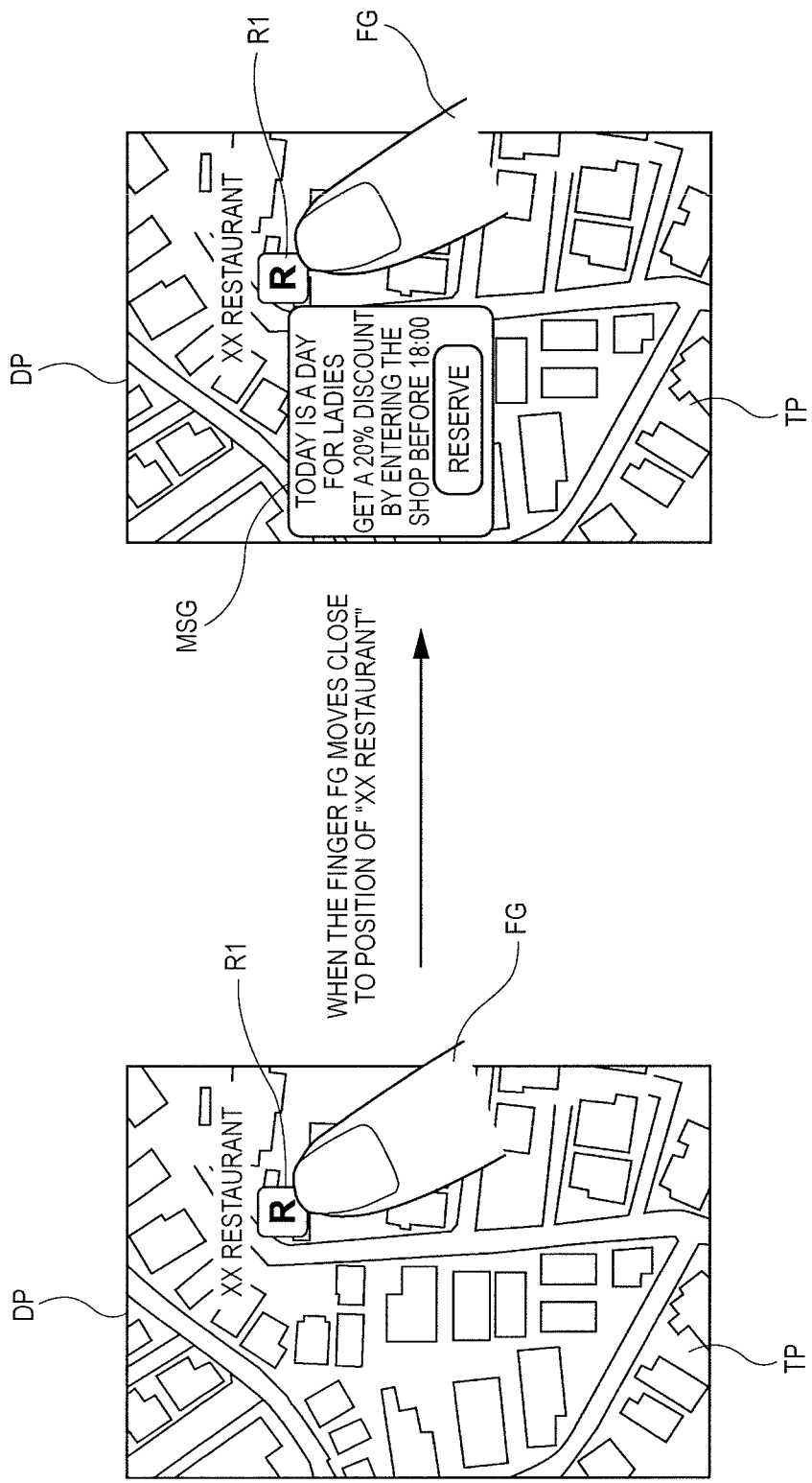
FIG. 3 is a diagram illustrating screen display examples before and after the finger FG moves close to the object "XX restaurant".

In a first embodiment, when the finger FG is close to a specific object (for example, "XX restaurant") in map content displayed on a screen, a portable terminal 10 requests the additional information for an object displayed at the proximity corresponding position of the finger FG from a server device 20, and displays the additional information for the object which is delivered from the server device 20, in the vicinity of the proximity corresponding position of the finger FG (see FIG. 3).

(Functional Components of Information Display Control System 50 in First Embodiment)

Figure 1:
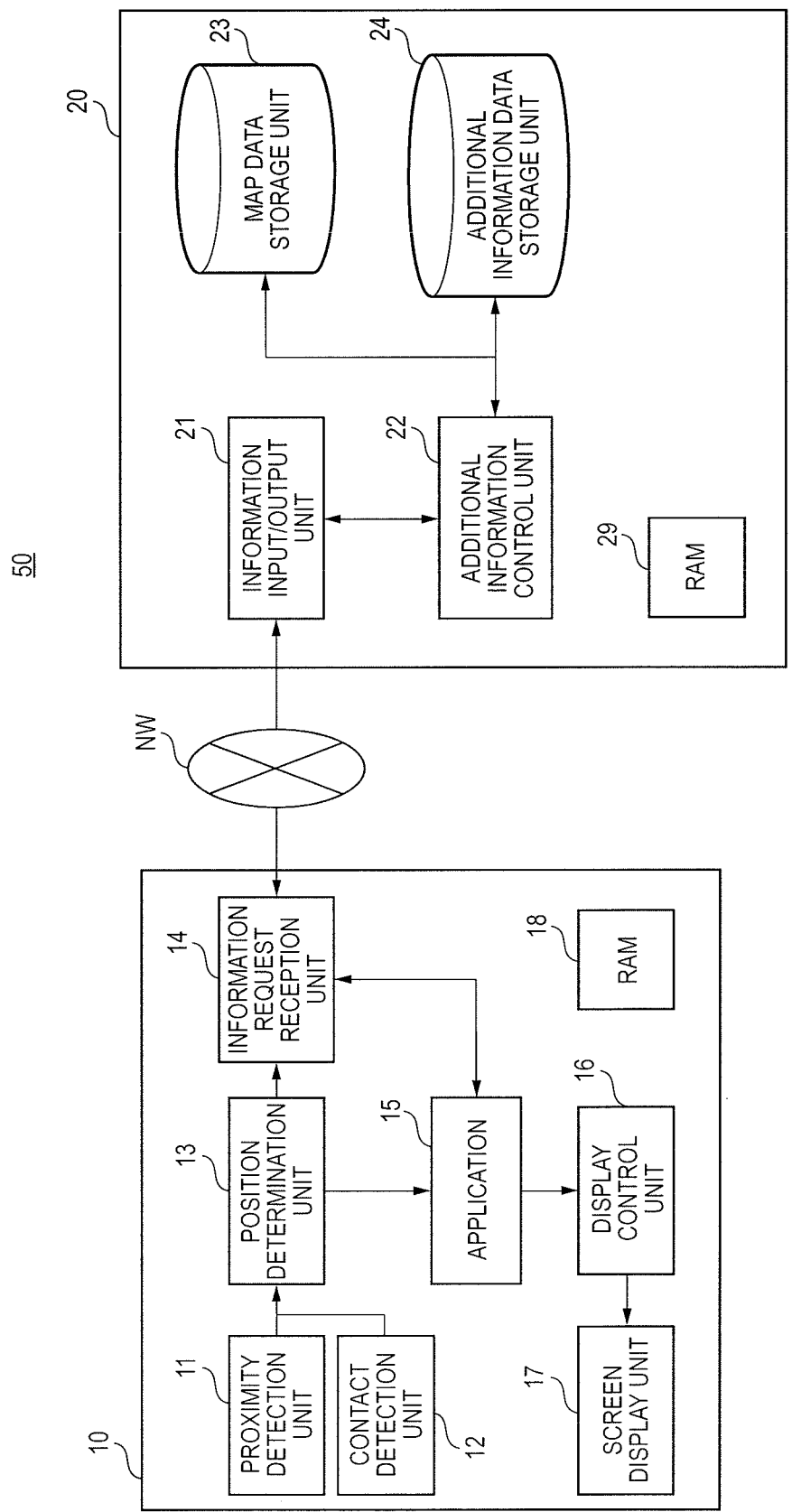
FIG. 1 is a block diagram illustrating respective functional components of an information display control system 50 according to a first embodiment.

First, respective functional components of an information display control system 50 according to the first embodiment will be described with reference to FIG. 1. FIG. 1 is a block diagram illustrating respective functional components of the information display control system 50 according to the first embodiment. The information display control system 50 illustrated in FIG. 1 includes a portable terminal 10, and a server device 20 connected to the portable terminal 10 through a network NW. In addition, in order to simplify FIG. 1, FIG. 1 illustrates only one portable terminal 10, but the information display control system 50 may be configured to include, for example, a plurality of portable terminals which are used by respective users, and the server device 20. Hereinafter, to simplify the explanation, it is assumed that one portable terminal configures the information display control system 50.

The portable terminal 10 includes a proximity detection unit 11, a contact detection unit 12, a position determination unit 13, an information request reception unit 14, an application 15, a display control unit 16, a screen display unit 17, and a Random Access Memory (RAM) 18. The server device 20 includes an information input/output unit 21, an additional information control unit 22, a map data storage unit 23, an additional information data storage unit 24 and a RAM 29. The network NW may be a wide-area wireless communication network such as, for example, 3G or Long Term Evolution (LTE), or a local wireless communication network such as a Local Area Network (LAN), and is the same in the following respective embodiments. The configuration of the respective portions of the portable terminal 10 and the server device 20 will be described in the order of the portable terminal 10 and the server device 20.

(Portable Terminal 10)

The proximity detection unit 11 detects that the user's finger FG (see FIG. 3) is close to the touch panel TP due to the hover operation or the hover slide operation. The proximity detection unit 11 outputs proximity notification indicating that the finger FG is close to the touch panel TP to the position determination unit 13.

The contact detection unit 12 detects that the finger FG touches (contacts) the touch panel TP due to the touch operation or the touch slide operation. The contact detection unit 12 outputs the contact notification indicating that the finger FG touches (contacts) the touch panel TP to the position determination unit 13.

The position determination unit 13 calculates proximity coordinates (x, y, z) of the finger FG for the touch panel TP as the proximity detection signal at the time of detecting proximity, based on the proximity notification which is output from the proximity detection unit 11. In addition, the following description will be made assuming that the proximity detection signal indicates the proximity coordinates, but the proximity detection signal may be an electrostatic capacitance value calculated at the time of detecting proximity.

As described above, in the proximity coordinates (x, y, z), the x coordinate value and the y coordinate value are coordinate values representing the position on the horizontal plane of the touch panel TP mounted on the screen DP (see FIG. 2 or FIG. 3) of the screen display unit 17, that is, a proximity corresponding position, and a z component is a coordinate value representing a distance (height) between the finger FG and the touch panel TP in the z axis direction.

The position determination unit 13 outputs the information regarding the calculated proximity coordinates (x, y, z) to the information request reception unit 14 and the application 15. Further, the position determination unit 13 generates information indicating a request for the additional information for the object in the map content which is displayed in the proximity corresponding position, based on the proximity notification which is output from the proximity detection unit 11, and outputs the information to the information request reception unit 14. In addition, the proximity detection unit 11 and the position determination unit 13 may be collectively configured as a proximity detection unit.

Further, the position determination unit 13 calculates the touch coordinates (x, y) when the finger FG touches (contacts) the touch panel TP, as a contact detection signal at the contact detection time, based on the contact notification which is output from the contact detection unit 12. In addition, the contact detection signal may be touch coordinates or an electrostatic capacitance value that is calculated at the contact detection time. The position determination unit 13 outputs information regarding the calculated touch coordinates (x, y) to the information request reception unit 14 and the application 15. In addition, the contact detection unit 12 and the position determination unit 13 may be collectively configured as a contact detection unit.

In addition, in respective embodiments including the present embodiment, the touch panel TP capable of detecting both the touching (contact) and the proximity of the finger FG can be configured by using the proximity detection unit 11, the contact detection unit 12 and the position determination unit 13.

The information request reception unit 14 which is the information request unit functions as the communication interface with the server device 20 connected through the network NW. The information request reception unit 14 transmits information of the proximity coordinates (x, y, z) which are output from the position determination unit 13 and information indicating a request for the additional information for the object in the map content which is displayed at the proximity corresponding position to the server device 20 through the network NW. The information request reception unit 14 receives the additional information for an object which is delivered from the server device 20, in response to the request from the information request reception unit 14, and outputs the additional information to the application 15.

The application 15 which is an operation execution unit is stored in advance in the Read Only Memory (ROM) incorporated in the portable terminal 10, and for example, is a map application. The application 15 executes an operation in response to the user's input operation for the map content or the additional information for the object in the map content delivered from the server device 20. The application 15 outputs the execution result of the operation in response to the user's input operation for the map content or the additional information for the object in the map content, to the display control unit 16.

Further, the application 15 may request the execution result of the operation in response to the user's input operation for the map content or the additional information for the object in the map content from the server device 20 through the information request reception unit 14, and acquire data of the execution result which is delivered from the server device 20. For example, the application 15 may request the map content which is not displayed on the screen DP from the server device 20, and acquire the map content data delivered from the server device 20.

The display control unit 16 displays the execution result of the operation of the application 15 in response to the user's input operation for the map content or the additional information for the object in the map content on the screen display unit 17. In addition, in the respective embodiments including the present embodiment, the display control unit 16 and the application 15 may be configured integrally.

The screen display unit 17 is configured by using, for example, an LCD or an organic EL display, has a function of displaying data on the screen DP, and displays, for example, data which is output from the display control unit 16 on the screen DP.

The RAM 18 is a work memory during the operation of each portion of the portable terminal 10. The respective portions of the position determination unit 13, the application 15 and the display control unit 16 can be operated by a processor (not shown) incorporated in the portable terminal 10 reading and executing a program defining the operation of the portable terminal 10. In addition, the processor is, for example, a Central Processing Unit (CPU), a Micro Processing Unit (MPU) or a Digital Signal Processor (DSP), and is the same in the following respective embodiments. Further, the program is stored in advance in the ROM (not shown) incorporated in the portable terminal 10.

(Server Device 20)

The information input/output unit 21 which is an information delivery unit functions as the communication interface with the portable terminal 10 connected through the network NW. The information input/output unit 21 receives information of the proximity coordinates (x, y, z) which are transmitted from the information request reception unit 14 and information indicating a request for the additional information for the object in the map content displayed in the proximity corresponding position, and outputs the information to the additional information control unit 22. The information input/output unit 21 delivers (transmits) the additional information for the object which is output from the additional information control unit 22 to the portable terminal 10.

The additional information control unit 22 identifies the specific position on the map content indicating the coordinates of the proximity corresponding position (an x coordinate value and a y coordinate value of the proximity coordinates), based on the information of the proximity coordinates (x, y, z) and the information indicating a request for the additional information for the object in the map content displayed in the proximity corresponding position, by referring to the map content data which is temporarily stored in the RAM 29 or the map data storage unit 23. In the respective embodiments including the present embodiment, for example, latitude and longitude are used as the information for identifying the specific position on the map content, but the information is not limited to the latitude and the longitude.

The additional information control unit 22 acquires the additional information for the object in the map content displayed in the proximity corresponding position from the additional information data storage unit 24, based on information regarding the specific position on the map content indicated by the coordinates of the proximity corresponding position, by referring to the additional information data storage unit 24. The additional information control unit 22 outputs the additional information for the object in the map content displayed in the proximity corresponding position to the information input/output unit 21.

Figure 2:
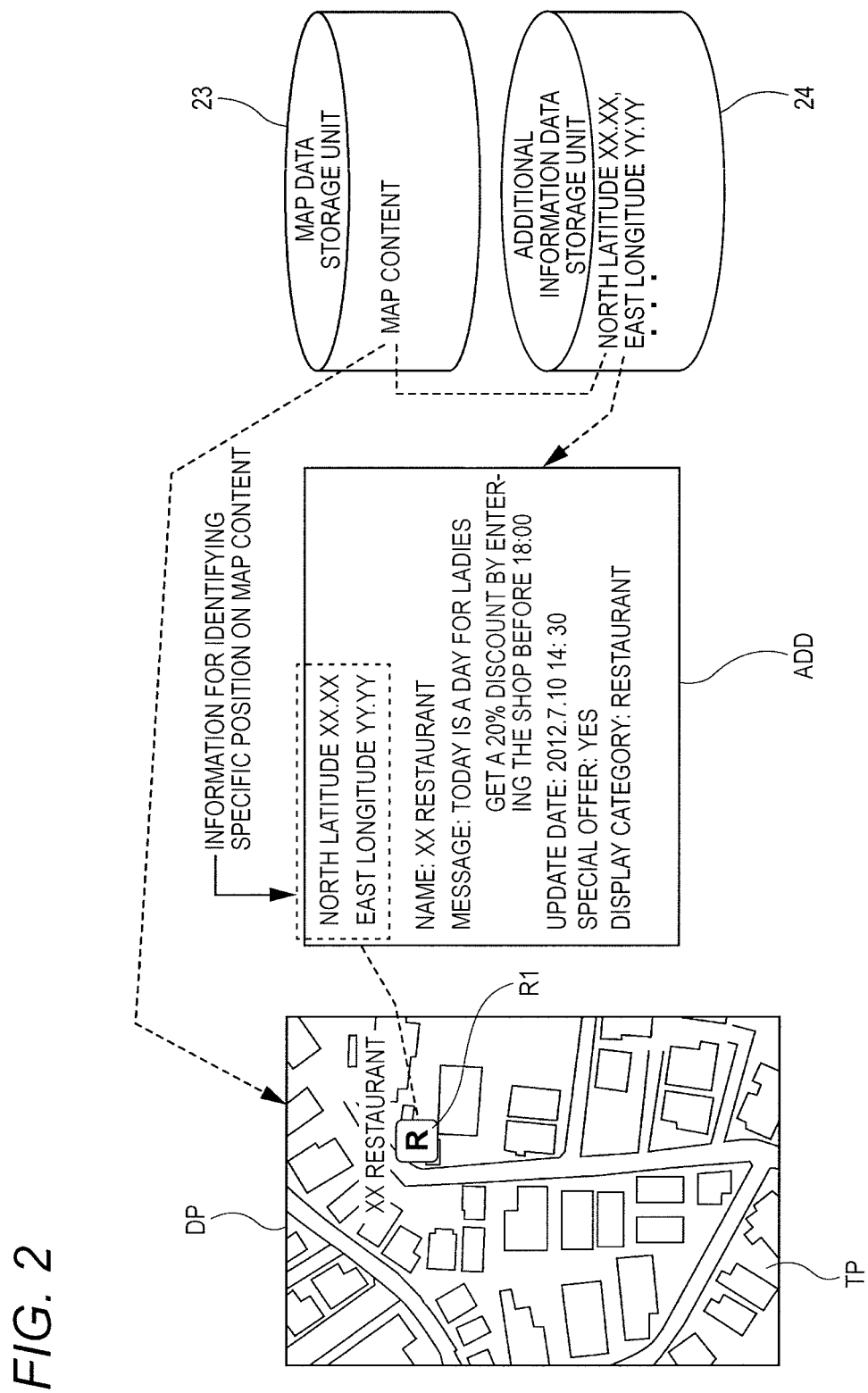
FIG. 2 is an explanatory diagram illustrating a relationship between map content data and additional information data in the first embodiment.

The map data storage unit 23 and the additional information data storage unit 24 will be described with reference to FIG. 2. FIG. 2 is an explanatory diagram illustrating a relationship between the map content data and the additional information data in the first embodiment.

The map data storage unit 23 stores map content data to be displayed on the screen DP in the map application.

The additional information data storage unit 24 stores additional information ADD of any object in the map content for each object in the map content. The additional information ADD is provided corresponding to one object in the map content, and as illustrated in FIG. 2, includes information for identifying a specific position on the map content (for example, latitude and longitude), a name, a message, an update date, the presence or absence of special offers, and a display category. In addition, the type and the display format of the additional information illustrated in FIG. 2 is merely an example, and is not particularly limited.

The name represents the name of an object. The message represents information related to the object (for example, message details that arouse interest in the user). The update date represents the date and time when additional information ADD is saved or updated (see the second embodiment) in the additional information data storage unit 24. The presence or absence of special offers represents the presence or absence of special offers for the object. The display category represents the category of the object (for example, a restaurant, a hospital, a train station, and the like).

In the additional information ADD of "XX restaurant" shown in FIG. 2, information for identifying a specific position on the map content is north latitude "XX,YY" and east longitude "YY,YY", a name is "XX restaurant", and a message is "Today is a day for ladies. Get a 20% discount by entering the shop before 18:00", an update date is "2012.7.10 14:30", special offers is "Yes", and a display category is "restaurant".

The additional information control unit 22 identifies the specific position on the map content indicated by the coordinates of the proximity corresponding position, searches the additional information data storage unit 24 with information of the identified specific position on the map content indicated by the coordinates as a key, and extracts data of the corresponding additional information ADD.

The additional information control unit 22 can be operated by a processor (not shown) incorporated in the server device 20 reading and executing a program defining the operation of the server device 20. In addition, the processor is, for example, a CPU, an MPU or a DSP, and is the same in the following respective embodiments. Further, the program is stored in advance in the ROM (not shown) incorporated in the server device 20.

(Operation of Information Display Control System 50 in First Embodiment)

Figure 4:
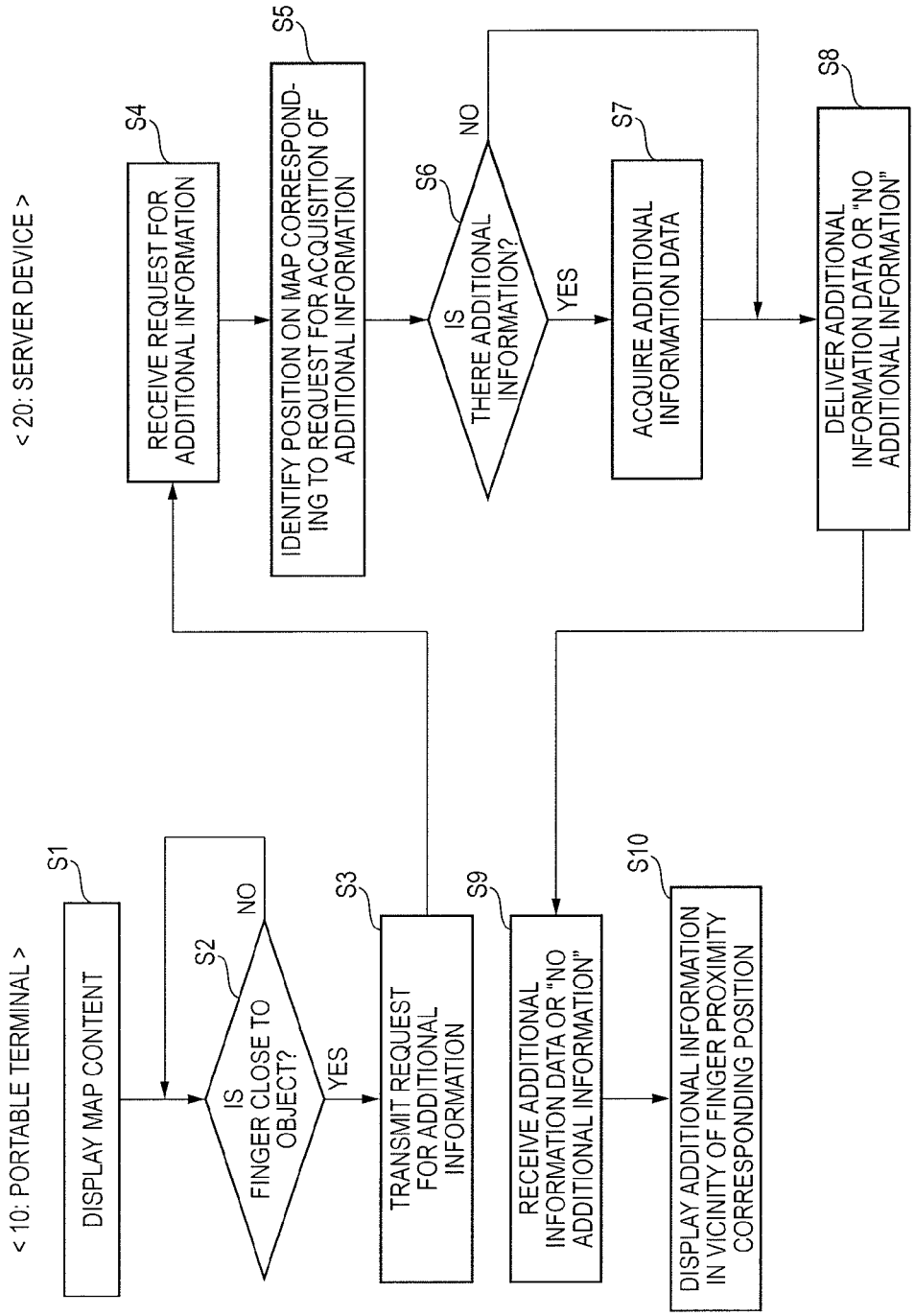
FIG. 4 is a flowchart describing respective operating procedures of a portable terminal 10 and a server device 20 in the first embodiment.

Next, the operation of the information display control system 50 in the first embodiment will be described with reference to FIGS. 3 and 4. FIG. 3 is a diagram illustrating screen display examples before and after the finger FG moves close to the object "XX restaurant". The screen DP on the left side of FIG. 3 illustrates an aspect immediately before the finger FG becomes close to the object "XX restaurant" in the map content displayed on the screen DP. The screen DP on the right side of FIG. 3 illustrates an aspect after the finger FG becomes close to the object "XX restaurant" in the map content displayed on the screen DP. FIG. 4 is a flowchart describing respective operating procedures of the portable terminal 10 and the server device 20 in the first embodiment. Hereinafter, in the description of FIG. 4, respective operations of the portable terminal 10 and the server device 20 will be described in time series, by referring to the details of FIG. 3, as necessary.

First, the portable terminal 10 makes a request for delivery of the map content to the server device 20, in the map application. The server device 20 reads map content data from the map data storage unit 23 and delivers the map content data to the portable terminal 10, in the map application, in response to the request from the portable terminal 10. The portable terminal 10 displays the map content data delivered from the server device 20 on the screen DP (S1).

After step S1, the proximity detection unit 11 detects whether or not the user's finger FG moves close to any object in the map content displayed on the screen DP (S2). When the proximity detection unit 11 detects that the user's finger FG moves close to any object in the map content displayed on the screen DP (S2, YES), the position determination unit 13 calculates proximity coordinates (x, y, z) of the finger FG for the touch panel TP, as a proximity detection signal at the time of proximity detection, based on the proximity notification which is output from the proximity detection unit 11.

The position determination unit 13 outputs information regarding the calculated proximity coordinates (x, y, z) and information indicating a request for the additional information for the object in the map content displayed at a proximity corresponding position, to the information request reception unit 14. The information request reception unit 14 transmits the information regarding the proximity coordinates (x, y, z) and the information indicating a request for the additional information for the object in the map content displayed at the proximity corresponding position, which are output from the position determination unit 13, to the server device 20 through the network NW (S3).

The information input/output unit 21 receives the information regarding the proximity coordinates (x, y, z) and the information indicating a request for the additional information for the object in the map content displayed at the proximity corresponding position, which are transmitted from the information request reception unit 14, and outputs the received information to the additional information control unit 22 (S4). The additional information control unit 22 identifies a specific position on the map content which is indicated by the coordinates (an x coordinate value and a y coordinate value of the proximity coordinates) of the proximity corresponding position, by referring to map content data which is temporarily stored in the RAM 29 or the map data storage unit 23, based on the information regarding the proximity coordinates (x, y, z) and the information indicating a request for the additional information for the object in the map content displayed at the proximity corresponding position (S5).

The additional information control unit 22 searches the additional information data storage unit 24, by using the information regarding the identified specific position on the map content as a key, based on the information regarding the specific position on the map content which is indicated by the coordinates of the proximity corresponding position (S6). When additional information ADD of the corresponding object is extracted (S6, YES), the additional information control unit 22 acquires the extracted additional information ADD from the additional information data storage unit 24 (S7). The additional information control unit 22 outputs either the additional information ADD of the object in the map content displayed at the proximity corresponding position or information indicating that there is no additional information ADD when the additional information ADD is not extracted in step S6, to the information input/output unit 21.

The information input/output unit 21 delivers (transmits) either the additional information ADD of the object in response to the request from the portable terminal 10 or the information indicating that there is no additional information ADD, to the portable terminal 10 (S8). In addition, the process may be ended, in a state in which the information input/output unit 21 does not deliver the information indicating that there is no additional information ADD.

The information request reception unit 14 receives either the additional information ADD of the object or the information indicating that there is no additional information ADD which is delivered (transmitted) from the server device 20, and outputs the received information to the application 15 (S9). When the information request reception unit 14 receives the additional information ADD of the object, the application 15 outputs the additional information ADD of the object to the display control unit 16. The display control unit 16 displays a pop-up window MSG displaying the details of a message of the additional information ADD of the object which is output from the application 15 as related information of the object, in the vicinity of the proximity corresponding position on the screen DP (S10, see the right side of FIG. 3).

In step S10, as illustrated in FIG. 3, the display control unit 16 displays a pop-up window MSG displaying details of a message "Today is a day for ladies. Get a 20% discount by entering the shop before 18:00" in the additional information ADD of the object "XX restaurant" which is delivered (transmitted) from the server device 20 in the vicinity of the proximity corresponding position on the screen DP. Further, as illustrated in FIG. 3, the display control unit 16 may additionally display a "reservation" button for making a reservation for "XX restaurant" on a pop-up window MGS which is the related information of the object "XX restaurant".

For example, the "reservation" button is associated with identification information (for example, URL) for accessing the site of "XX restaurant" or a telephone number, and if the user operates the "reservation" button in order to make a reservation for "XX restaurant", the portable terminal 10 switches the screen of the map application to the screen of the site of "XX restaurant", or makes a call to the phone number of "XX restaurant" (see FIG. 12).

As described above, in the information display control system 50 of the present embodiment, the portable terminal 10 makes a request to the server device 20 to deliver (transmit) the additional information ADD for an object in the map content displayed in the proximity corresponding position, and the server device 20 acquires the additional information ADD of the object in response to the request from the portable terminal 10, and delivers (transmits) the additional information ADD to the portable terminal 10. The portable terminal 10 displays, for example, a pop-up window MSG displaying the details of a message of the additional information ADD for an object which is delivered (transmitted) from the server device 20, in the vicinity of the proximity corresponding position of the screen DP.

Thus, the information display control system 50 can display, for example, a pop-up window MSG displaying the details of a message of the additional information ADD for an object of content displayed at the position on the screen (proximity corresponding position) at which the proximity of a physical object (the user's finger FG) to the screen DP (touch panel TP) is detected, in the vicinity of the proximity corresponding position, as the related information of the object. In other words, the portable terminal 10 can simply display, for example, the pop-up window MSG displaying the details of a message of the additional information ADD for an object displayed at the proximity corresponding position of the map content displayed on the screen DP in the map application, due to the finger FG moving close, and since the screen of the map application is switched to, for example, the screen "XX restaurant", it is not necessary to check the details corresponding to the additional information ADD in the details of the site of "XX restaurant", such that it is possible to reduce the complexity of the user's operation, and to improve user operability.

Second Embodiment

An information display control system 60 in a second embodiment further includes an external terminal capable of updating (changing) the details of the additional information ADD for each object of map content, in addition to the details of the first embodiment, and an example is described in which when a predetermined condition is satisfied, a server device 20A updates (changes) the details of the additional information ADD, in response to an update request from the external terminal.

Figure 5:
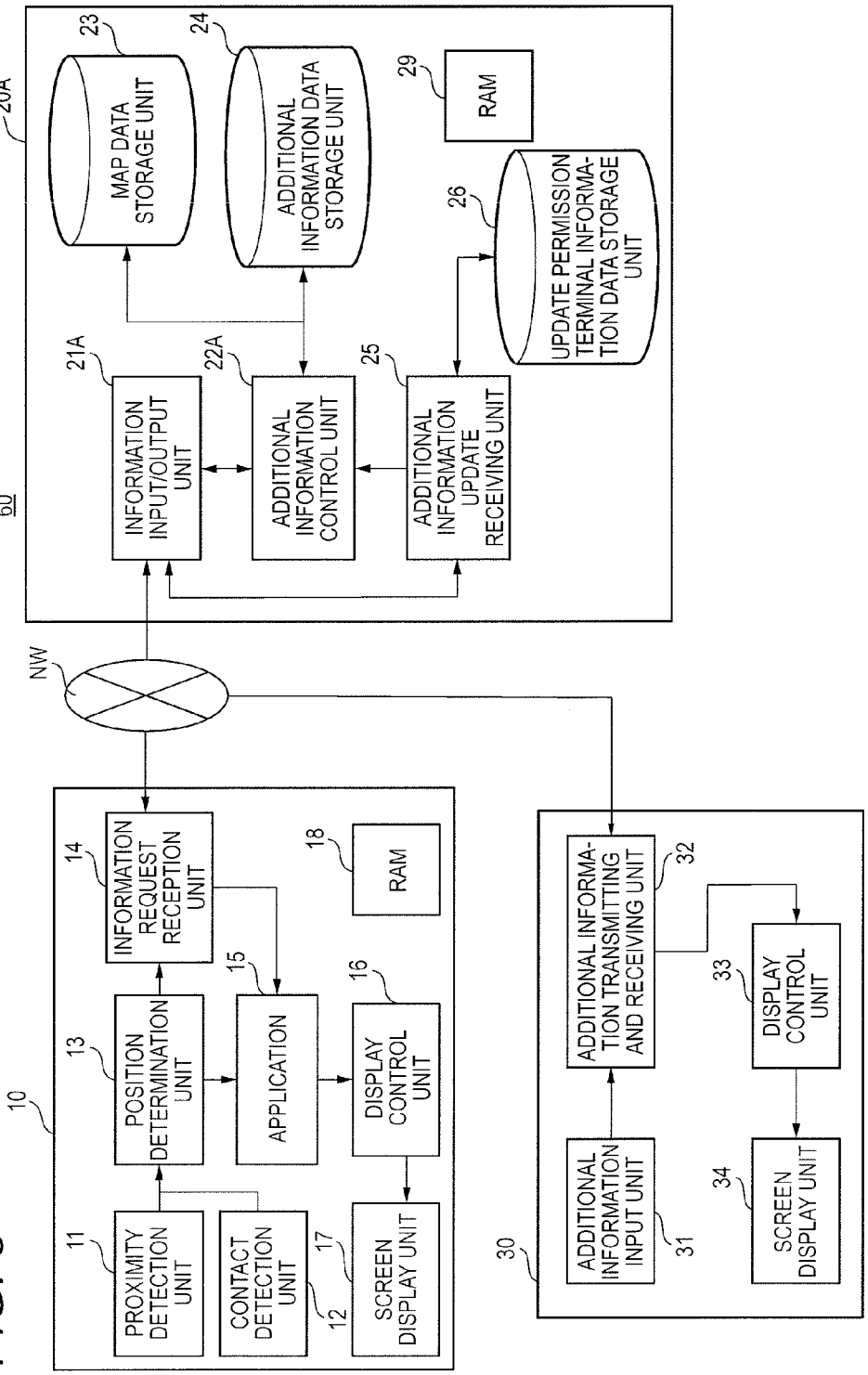
FIG. 5 is a block diagram illustrating respective internal components of an information display control system 60 according to a second embodiment.

FIG. 5 is a block diagram illustrating respective internal components of the information display control system 60 according to the second embodiment. In the second embodiment, the configuration and the operation of the portable terminal 10 are the same as in the first embodiment, and thus the description thereof will be omitted. The information display control system 60 illustrated in FIG. 5 includes a portable terminal 10, the server device 20A connected to the portable terminal 10 through a network NW, and an external terminal 30 connected to the server device 20A through the network NW.

The server device 20A includes an information input/output unit 21A, an additional information control unit 22A, a map data storage unit 23, an additional information data storage unit 24, an additional information update receiving unit 25, an update permission terminal information data storage unit 26 and a RAM 29. The external terminal 30 includes an additional information input unit 31, an additional information transmitting and receiving unit 32, a display control unit 33 and a screen display unit 34. In respective structures and operations of the server device 20A, description of the same details as in the first embodiment will be omitted, and different details will be described. The configuration of the respective portions of the server device 20A and the external terminal 30 will be described in the order of the server device 20A and the external terminal 30.

(Server Device 20A)

The additional information update receiving unit 25 which is an update permission verification unit acquires identification information of the external terminal 30 which is transmitted from the external terminal 30 and information (for example, latitude and longitude) for identifying a specific position on the map content of a target object of which the details of the additional information ADD are to be updated, from the information input/output unit 21. The additional information update receiving unit 25 verifies whether or not the external terminal 30 is a terminal for which the update of the additional information ADD of the target object may be permitted, by referring to the update permission terminal information data storage unit 26, based on the identification information of the external terminal 30 and the information for identifying the specific position on the map of the target object of which the details of the additional information ADD are to be updated.

When update permission terminal information in which the identification information of the external terminal 30 and the information for identifying a specific position on the map of the target object of which the details of the additional information ADD are to be updated are associated with each other is stored in the update permission terminal information data storage unit 26, the additional information update receiving unit 25 determines that verification is successful.

When verification as to whether or not the external terminal 30 is a terminal for which the update of the additional information ADD of the target object may be permitted is successful, the additional information update receiving unit 25 outputs information indicating that the verification is successful, to the information input/output unit 21A and the additional information control unit 22A.

The update permission terminal information data storage unit 26 stores update permission terminal information in which any object in the map content and identification information of the external terminal for which the update (change) of the details of the additional information ADD of the object is permitted are associated, for each object. For example, two restaurants are displayed on the screen DP on the left side of FIG. 12, and the update permission terminal information data storage unit 26 stores update permission terminal information for designating the external terminal for which the update (change) of the details of the additional information ADD is permitted, for each object (restaurant).

Further, when, for example, two restaurants displayed in FIG. 12 are managed by the same owner, the update permission terminal information data storage unit 26 may store the update permission terminal information for designating that the external terminal for which the update of the details of the additional information ADD of each restaurant is permitted is the same for each restaurant, for each object (restaurant).

Further, the update permission terminal information may be information in which information (for example, latitude and longitude) for identifying a specific position on the map content of the object, instead of any object in the map content, and identification information of the external terminal for which the update (change) of the details of the additional information ADD of the object is permitted are associated.

If acquiring new additional information transmitted from the external terminal 30 from the information input/output unit 21A, the additional information control unit 22A updates the details of the current additional information ADD stored in the additional information data storage unit 24 to the details of the new additional information, based on information indicating that verification is successful which is output from the additional information update receiving unit 25. Further, when the details of the additional information ADD are updated, the additional information control unit 22A also updates the details of item "update date" of the additional information data of the additional information ADD.

(External Terminal 30)

The external terminal 30 is the same portable electronic terminal as a personal computer (PC) or a portable terminal 10 used by an owner who operates, for example, "XX restaurant", and is capable of executing the same map application executable by the portable terminal 10.

The additional information input unit 31 is a user interface by which the user of the external terminal 30 inputs an operation with respect to the external terminal 30, and outputs data which is input by the user (for example, information indicating a request for the update of the additional information ADD or new additional information ADD obtained by updating the details of the current additional information ADD), to the additional information transmitting and receiving unit 32.

When the external terminal 30 is, for example, a smart phone, the additional information input unit 31 may be configured with a touch panel which is mounted on the screen display unit 34, and is capable of receiving an input operation with the user's finger or a stylus pen. Further, when the external terminal 30 is a mobile phone, the additional information input unit 31 may be configured with various keys such as numeric keys for entering phone numbers and the like, call keys for performing on-hook or off-hook, and function keys.

The additional information transmitting and receiving unit 32 outputs data which is output from the additional information input unit 31 (for example, information indicating a request for the update of the additional information ADD or new additional information obtained by updating the details of the current additional information ADD) to the display control unit 33, and transmits data to the server device 20A through the network NW. The additional information transmitting and receiving unit 32 outputs the data of the current additional information ADD which is transmitted from the server device 20A, to the display control unit 33.

The display control unit 33 acquires the data of new additional information ADD which is output from the additional information transmitting and receiving unit 32 and displays the data on the screen display unit 34. Further, the display control unit 33 displays the details of the current additional information ADD which is output from the additional information transmitting and receiving unit 32 on the screen display unit 34.

Similarly to the screen display unit 17, the screen display unit 34 is configured by using, for example, an LCD or an organic EL display, has a function of displaying data on the screen DP, and displays, for example, data which is output from the display control unit 33 on the screen DP. Further, the external terminal 30 may have the same configuration as that of the portable terminal 10 described in the first embodiment (see FIG. 1).

Figure 6:
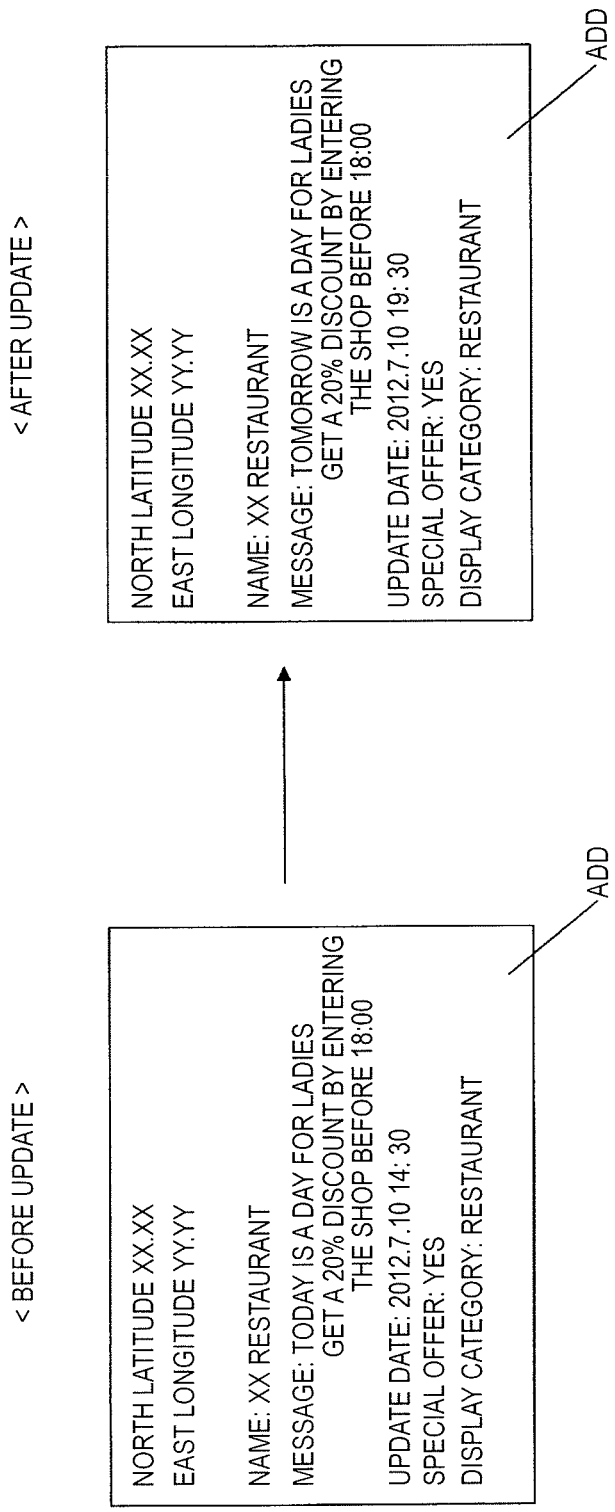
FIG. 6 is a diagram illustrating an example of the additional information data before update and the additional information data after update in the second embodiment.

Here, the additional information data before update and the additional information data after update in the second embodiment will be described with reference to FIG. 6. FIG. 6 is a diagram illustrating an example of the additional information data before update and the additional information data after update in the second embodiment. FIG. 6 illustrates an example in which the details of the message and the update date are updated, in respective items of the additional information ADD.

In FIG. 6, the details of item "message" of the additional information data of the additional information ADD before update is "Today is a day for ladies. Get a 20% discount by entering the shop before 18:00", but the details of item "message" of the additional information data of the additional information ADD after update is "Tomorrow is a day for ladies. Get a 20% discount by entering the shop before 18:00", and the message of the additional information ADD is updated. Further, when the additional information ADD is updated, the update date is also updated.

(Operation of Information Display Control System 60 in Second Embodiment)

Figure 7:
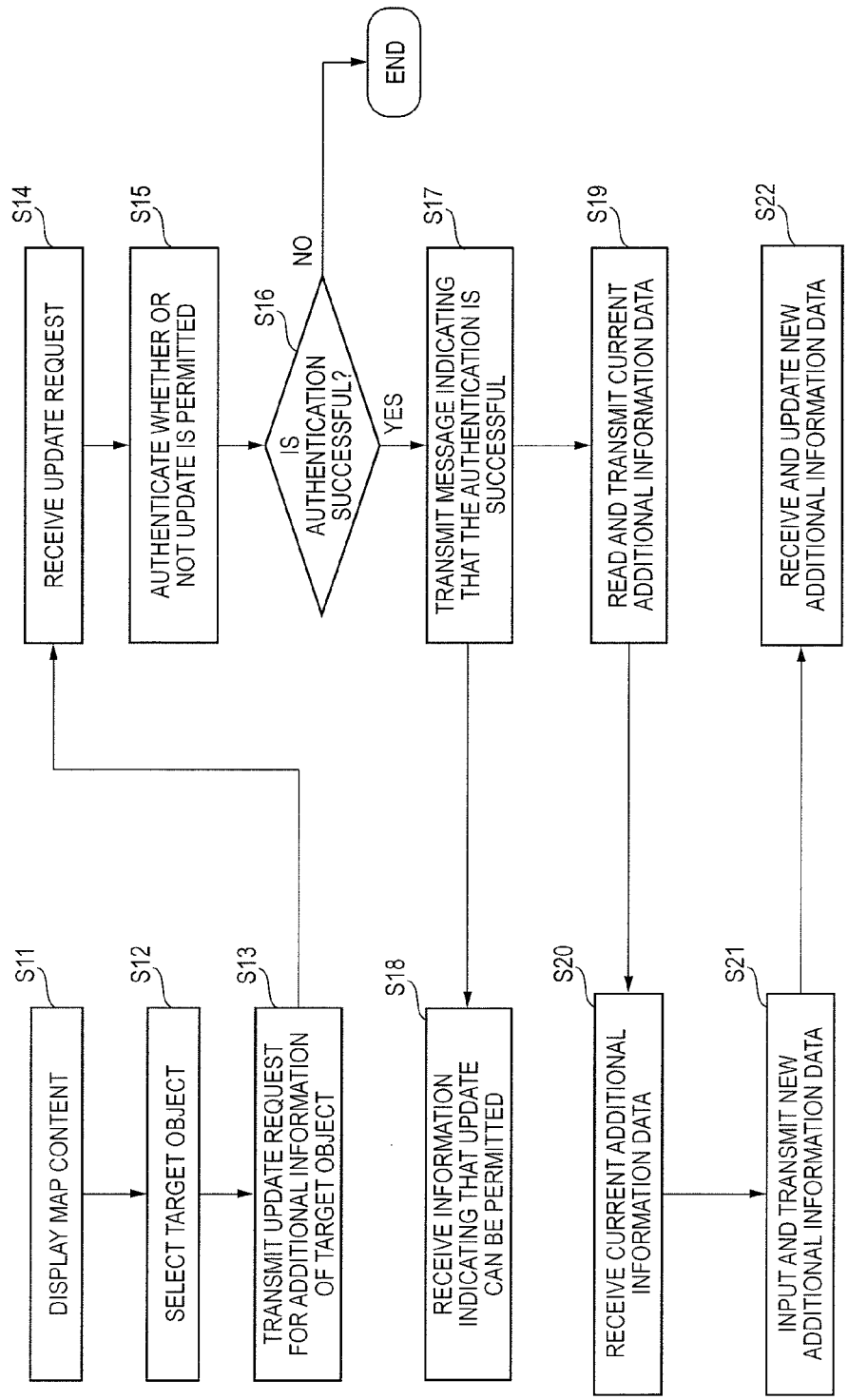
FIG. 7 is a flowchart describing respective operating procedures of an external terminal 30 and a server device 20A in the second embodiment.

Next, the operation of the information display control system 60 in the second embodiment will be described with reference to FIGS. 6 and 7. FIG. 7 is a flowchart describing respective operating procedures of the external terminal 30 and the server device 20A in the second embodiment. Hereinafter, in the description of FIG. 7, respective operations of the external terminal 30 and the server device 20A will be described in time series, by referring to the details of FIG. 6, as necessary.

First, the additional information transmitting and receiving unit 32 makes a request for delivery of map content of the map application to the server device 20A, in response to the user's input operation with respect to the additional information input unit 31. The server device 20A reads map content data in the map application from the map data storage unit 23, in response to the request from the external terminal 30, and delivers the data to the external terminal 30. The additional information transmitting and receiving unit 32 receives map content data that is delivered from the server device 20A, and outputs the data to the display control unit 33. The display control unit 33 displays the map content data which is output from the additional information transmitting and receiving unit 32 on the screen DP (S11).

Further, when the external terminal 30 has the same configuration as that of the portable terminal 10 described in the first embodiment, similarly to the first embodiment, the external terminal 30 may display a pop-up window MSG displaying the details of item "message" of the additional information ADD of the target object for update, in the vicinity of the proximity corresponding position on the screen display unit 34.

The additional information input unit 31 selects a target object of which the details of the additional information ADD are to be updated, in response to the user's input operation (S12), and generates information indicating a request for the update of the additional information ADD of the selected target object so as to output the information to the additional information transmitting and receiving unit 32. The additional information transmitting and receiving unit 32 transmits information indicating a request for the update of the additional information ADD for an object to be updated, which is output from the additional information input unit 31, to the server device 20A (S13).

In addition, information indicating a request for the update of the additional information ADD for an object includes identification information of the external terminal 30 (for example, a device ID of the external terminal 30), and information (for example, latitude and longitude) for identifying the specific position on the map content of the target object selected in step S12. The device ID of the external terminal 30 is a serial number of the external terminal 30.

The information input/output unit 21A receives information indicating a request for the update of the additional information ADD for an object, which is transmitted from the additional information transmitting and receiving unit 32, and outputs the information to the additional information update receiving unit 25 (S14). The additional information update receiving unit 25 acquires information indicating a request for the update of the additional information ADD for an object, in other words, identification information of the external terminal 30, and information for identifying the specific position on the map content of the target object, from the information input/output unit 21A.

The additional information update receiving unit 25 verifies whether or not the external terminal 30 is a terminal for which the update of the additional information ADD of the target object may be permitted, based on the identification information of the external terminal 30 and the information for identifying the specific position on the map of the target object of which the details of the additional information ADD are to be updated, by referring to the update permission terminal information data storage unit 26 (S15).

When the verification as to whether or not the external terminal 30 is a terminal for which the update of the additional information ADD of the object to be updated may be permitted fails (S16, NO), the additional information update receiving unit 25 outputs information indicating that the verification has failed, to the information input/output unit 21A. The information input/output unit 21A transmits the information indicating that the verification has failed to the external terminal 30. In this way, the operation of the server device 20A is ended.

Meanwhile, when the verification as to whether or not the external terminal 30 is a terminal for which the update of the additional information ADD of the object to be updated may be permitted is successful (S16, YES), the additional information update receiving unit 25 outputs information indicating that the verification is successful to the information input/output unit 21A and the additional information control unit 22A.

The information input/output unit 21A acquires the information (message) indicating that the verification is successful from the additional information update receiving unit 25, and transmits the information to the external terminal 30 (S17). The additional information transmitting and receiving unit 32 receives the information (message) indicating that the verification is successful from the information input/output unit 21 (S18).

Further, in the server device 20A, based on the information indicating that the verification is successful which is output from the additional information update receiving unit 25, the additional information control unit 22A reads the additional information data of the current additional information ADD of the object associated with the identification information of the external terminal 30 in the update permission terminal information from the additional information data storage unit 24 and outputs the information to the information input/output unit 21A (S19).

The information input/output unit 21A transmits the additional information data of the current additional information ADD which is output from the additional information control unit 22A to the external terminal 30 (S19). The additional information transmitting and receiving unit 32 receives the additional information data of the current additional information ADD which is transmitted from the information input/output unit 21, and outputs the data to the display control unit 33 (S20). The display control unit 33 displays the additional information data of the current additional information ADD which is output from the additional information transmitting and receiving unit 32 on the screen display unit 34.

The additional information input unit 31 outputs new additional information data which is input by the user with respect to the current additional information ADD displayed on the screen DP of the screen display unit 34 (for example, new additional information ADD obtained through the update with respect to the details of the current additional information ADD) to the additional information transmitting and receiving unit 32 (S21). For example, as illustrated in FIG. 6, the additional information input unit 31 inputs "Tomorrow is a day for ladies. Get a 20% discount by entering the shop before 18:00", as a message of additional information data of new additional information ADD, with respect to "Today is a day for ladies. Get a 20% discount by entering the shop before 18:00" which is a message of additional information data of the current additional information ADD (S21). The additional information transmitting and receiving unit 32 transmits the additional information data of the new additional information ADD which is output from the additional information input unit 31 to the server device 20A (S21).

The information input/output unit 21A receives the additional information data of the new additional information ADD which is transmitted from the additional information transmitting and receiving unit 32, and outputs the data to the additional information control unit 22A (S22). When the additional information data of the new additional information ADD is acquired from the information input/output unit 21A, the additional information control unit 22A updates the details of the current additional information ADD stored in the additional information data storage unit 24 to the details of the new additional information, based on the information indicating that the verification is successful which is output from the additional information update receiving unit 25 (S22).

For example, the additional information control unit 22A, as illustrated in FIG. 6, updates the message "Today is a day for ladies. Get a 20% discount by entering the shop before 18:00" of the additional information data of the additional information ADD of the current object "XX restaurant" to "Tomorrow is a day for ladies. Get a 20% discount by entering the shop before 18:00".

Thus, in the information display control system 60 of the present embodiment, the external terminal 30 transmits the information indicating a request for the update of the additional information ADD of the target object selected by the user's operation to the server device 20A, and the server device 20A verifies whether or not the details of the additional information data of the additional information ADD of the target object requested by the external terminal 30 may be updated. Only when the verification is successful, the server device 20A updates the details of the additional information ADD of the current object to the new additional information ADD which is transmitted from the external terminal 30.

Thus, in addition to the effect of the first embodiment, in the information display control system 60, only the external terminal 30 which is determined by the update permission terminal information can update the details of the additional information ADD of the object in the map content, and thus it is possible to prevent the update of the details of the additional information ADD by the external terminal of which the update is not permitted, and to ensure the confidentiality of the additional information ADD.

Further, in the information display control system 60, only the external terminal 30 which is determined by the update permission terminal information can update the details of the additional information ADD of the object in the map content, and thus for example, the owner of "XX restaurant" and the like can appropriately update the details of the additional information ADD of the "XX restaurant" to details suitable for the current circumstances. In other words, on the portable terminal 10, in the map application, the latest additional information ADD obtained through updating by the external terminal 30 which is determined by the update permission terminal information can be simply displayed and notified to the user, simply by moving the finger FG close to the object.

Third Embodiment

An example will be described in which in an information display control system 70 of a third embodiment, in addition to the details of the first or second embodiment, a portable terminal 10B additionally displays information for confirming whether or not to reject the display of the additional information ADD of the object as a pop-up window MSG2 displaying the details of the additional information ADD for an object, and a server device 20B registers the information indicating refusal to the display of the object in the individual browsing management information provided for each the identification information of the portable terminal 10B, in response to the operation of rejecting the display of the object from the portable terminal 10B.

Figure 8:
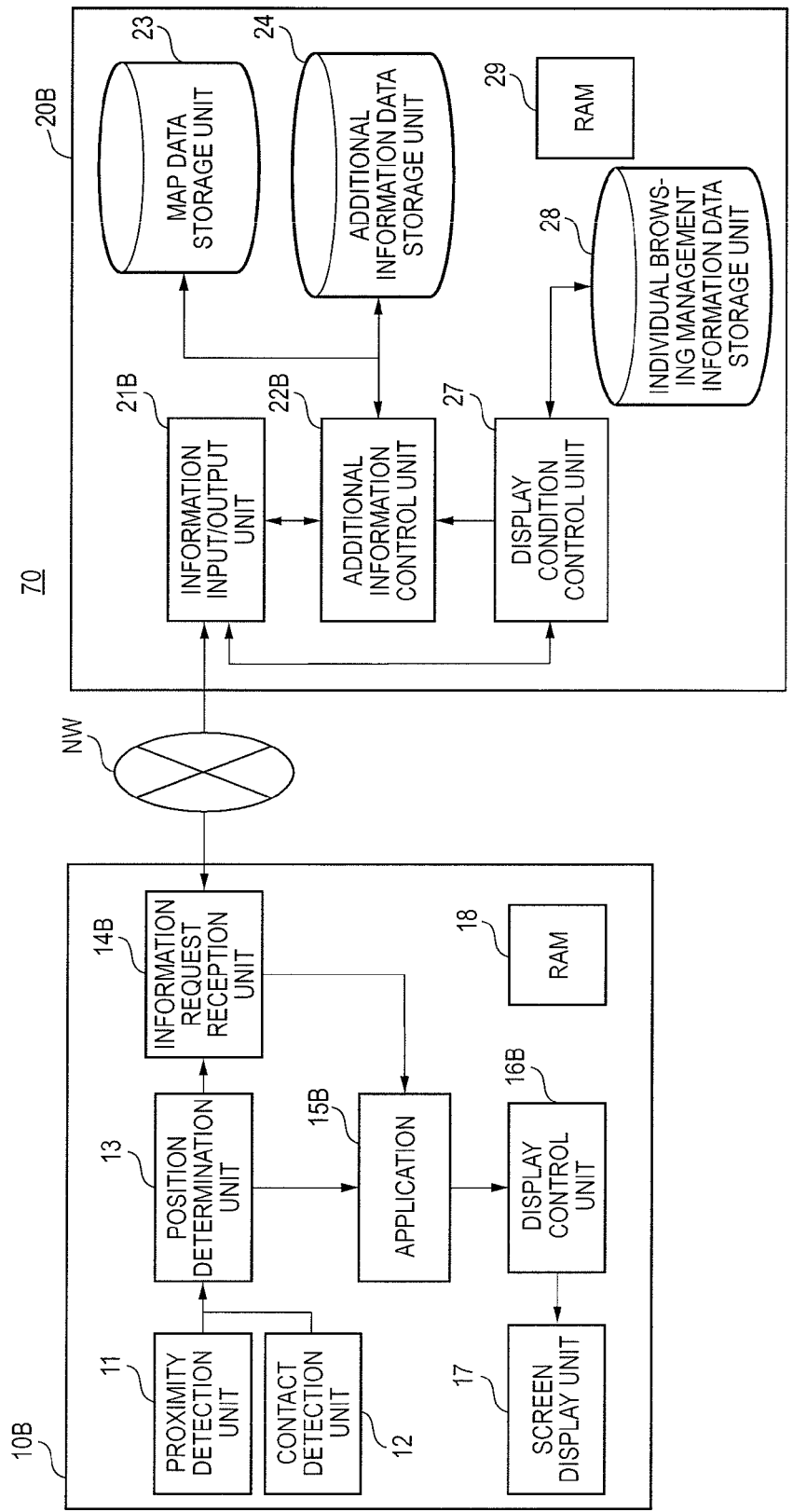
FIG. 8 is a block diagram illustrating respective internal components of an information display control system 70 according to a third embodiment.

FIG. 8 is a block diagram illustrating respective internal components of the information display control system 70 according to the third embodiment. The information display control system 70 illustrated in FIG. 8 includes the portable terminal 10B, and the server device 20B connected to the portable terminal 10B through the network NW. In addition, the external terminal 30 illustrated in FIG. 5 is not illustrated in FIG. 8, but the information display control system 70 illustrated in FIG. 8 may be configured to include the external terminal 30.

The portable terminal 10B includes a proximity detection unit 11, a contact detection unit 12, a position determination unit 13, an information request reception unit 14B, an application 15B, a display control unit 16B, a screen display unit 17 and a RAM 18. The server device 20B includes an information input/output unit 21B, an additional information control unit 22B, a map data storage unit 23, an additional information data storage unit 24, a display condition control unit 27, an individual browsing management information data storage unit 28 and a RAM 29. Further, the server device 20B may further include an additional information update receiving unit 25 and an update permission terminal information data storage unit 26 which are illustrated in FIG. 5. In respective structures and operations of the portable terminal 10B and the server device 20B, description of the same details as in the first or second embodiment will be omitted, and different details will be described. The configuration of the respective portions of the portable terminal 10B and the server device 20B will be described in the order of the portable terminal 10B and the server device 20B.

(Portable Terminal 10B)

The information request reception unit 14B receives additional information ADD for an object (see FIG. 2) which is transmitted from the server device 20B, and outputs the information to the application 15B.

The application 15B outputs the details of the additional information ADD (see FIG. 2) for an object which is output from the information request reception unit 14B and information indicating the display of the information for confirming whether to reject the display of the details of item "message" of the additional information ADD ("not display" button) to the display control unit 16B.

The display control unit 16B displays the details of item "message" of the additional information ADD of the object which is output from the application 15B and the information for confirming whether to reject the display of the details of the item "message" of the additional information ADD ("not display" button) in the vicinity of the proximity corresponding position of the screen DP.

Specifically, the display control unit 16B displays the details of the item "message" of the additional information ADD ("Today is a day for ladies. Get a 20% discount by entering the shop before 18:00"), and a "reservation" button for making a reservation in"XX restaurant", and the "not display" button for confirming whether to reject the display of the additional information ADD of "XX restaurant" on the screen DP, as a pop-up window MSG2 representing the details of the additional information ADD for an object (see FIG. 9).

(Server Device 20B)

The information input/output unit 21B receives information indicating refusal to the display of details of the item "message" of the additional information ADD and identification information of the portable terminal 10B from the portable terminal 10B, and outputs the information to the display condition control unit 27.

Figure 9:
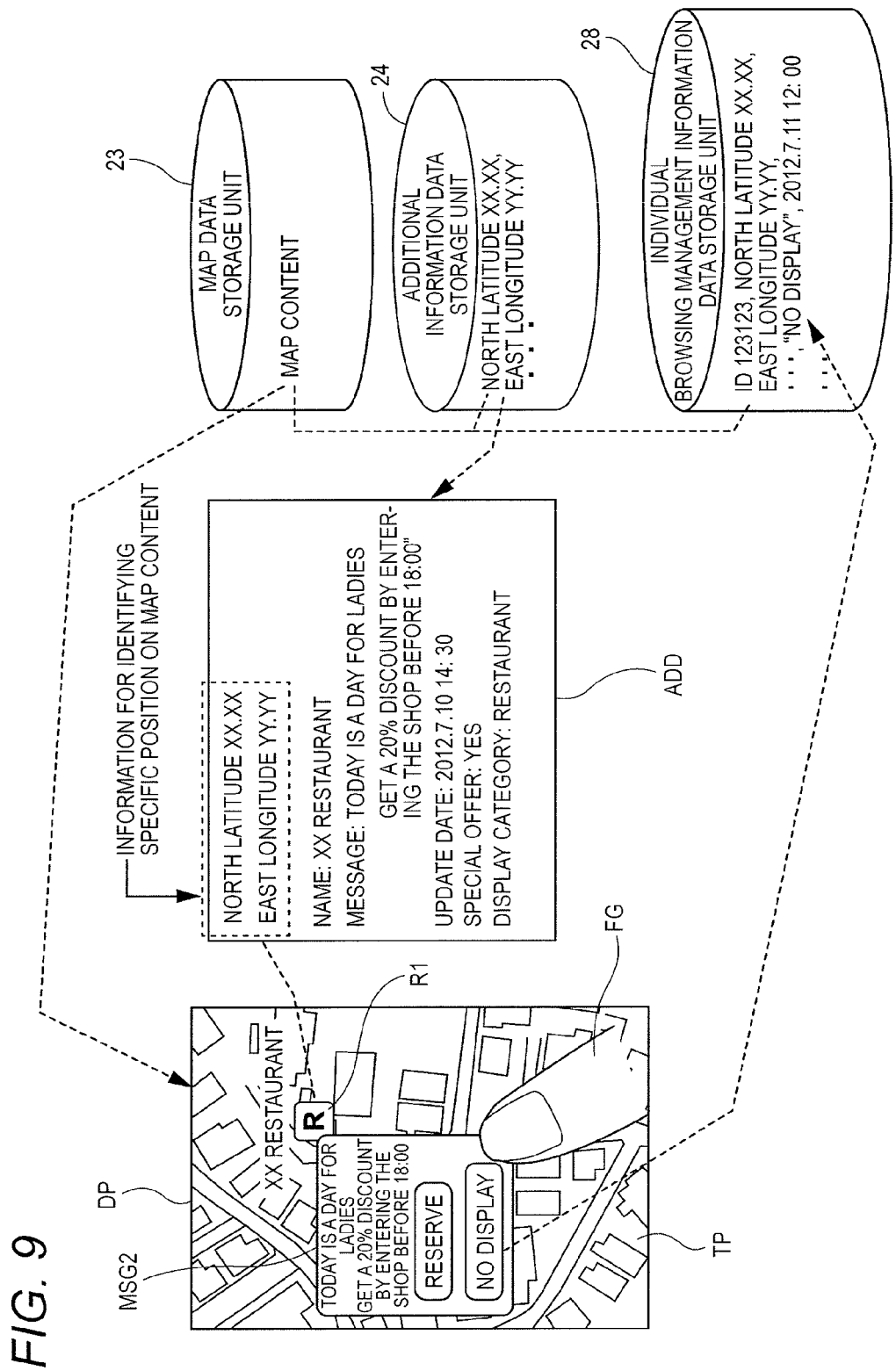
FIG. 9 is an explanatory diagram showing a relationship between the map data, the additional information data, and individual browsing information management data in the third embodiment.

The display condition control unit 27 registers information indicating refusal to the display of details of the item "message" of the additional information ADD in the individual browsing management information corresponding to the identification information of the portable terminal 10B stored in the individual browsing management information data storage unit 28, based on the information indicating refusal to the display of details of the item "message" of the additional information ADD and the identification information of the portable terminal 10B, among display refusal indicating information (see below) which is output from the information input/output unit 21B, and also registers the information of the registration date and time (see FIG. 9). In addition, the display refusal indicating information includes information indicating refusal to the display of the additional information ADD of the object "XX restaurant", identification information of the portable terminal 10B (for example, device ID), and information of the touch coordinates (x, y).

The display condition control unit 27 determines whether the information indicating refusal to the display of details of the item "message" of the additional information ADD is registered in the individual browsing management information corresponding to the identification information of the portable terminal 10B, by referring to the individual browsing management information data storage unit 28, based on the identification information of the portable terminal 10B and the information indicating refusal to the display of details of the item "message" of the additional information ADD, which are output from the information input/output unit 21B. The display condition control unit 27 outputs the determination result to the information input/output unit 21B.

The individual browsing management information data storage unit 28 stores individual browsing management information including information indicating refusal to the display of the item "message" of the additional information ADD of any object in the map content and information of the registration date and time of the information, for each piece of the identification information of the portable terminal 10B (for example, a serial number of the portable terminal 10B).

The map data storage unit 23, the additional information data storage unit 24, and the individual browsing management information data storage unit 28 will be described with reference to FIG. 9. FIG. 9 is an explanatory diagram showing a relationship between the map data, additional information data, and individual browsing information management data in the third embodiment. Since the map data storage unit 23 and the additional information data storage unit 24 are described in the first embodiment, the description thereof will be omitted.

The individual browsing management information stored in the individual browsing management information data storage unit 28 includes identification information (ID) of the portable terminal 10B, information (latitude and longitude) for identifying the specific position on the map content of the object, information indicating refusal to the display of the item "message" of the additional information ADD (information indicating not displaying), and information of the registration date and time of the information. In other words, the individual browsing management information includes the information indicating refusal to the display of the additional information ADD for an object identified by, for example, the latitude and longitude, and the information of the registration date and time of the information, as browsing details corresponding to the preference of the user using the portable terminal 10B having the identification information (ID).

When the finger FG of the user using the identification number (ID: 123123) of the portable terminal 10B touches the "not display" button displayed in the additional information ADD2 of the object "XX restaurant" displayed on the screen DP of the portable terminal 10B, the server device 20B registers the information indicating refusal to the display of the additional information ADD of the object "XX restaurant" (information indicating not display) in the individual browsing management information corresponding to the identification number (ID: 123123) of the portable terminal 10B, and also additionally registers information (Jul. 11, 2012) of registration date and time of the information.

(Operation of Information Display Control System 70 of the Third Embodiment: Registration of Information Indicating Refusal to Display)

Figure 10:
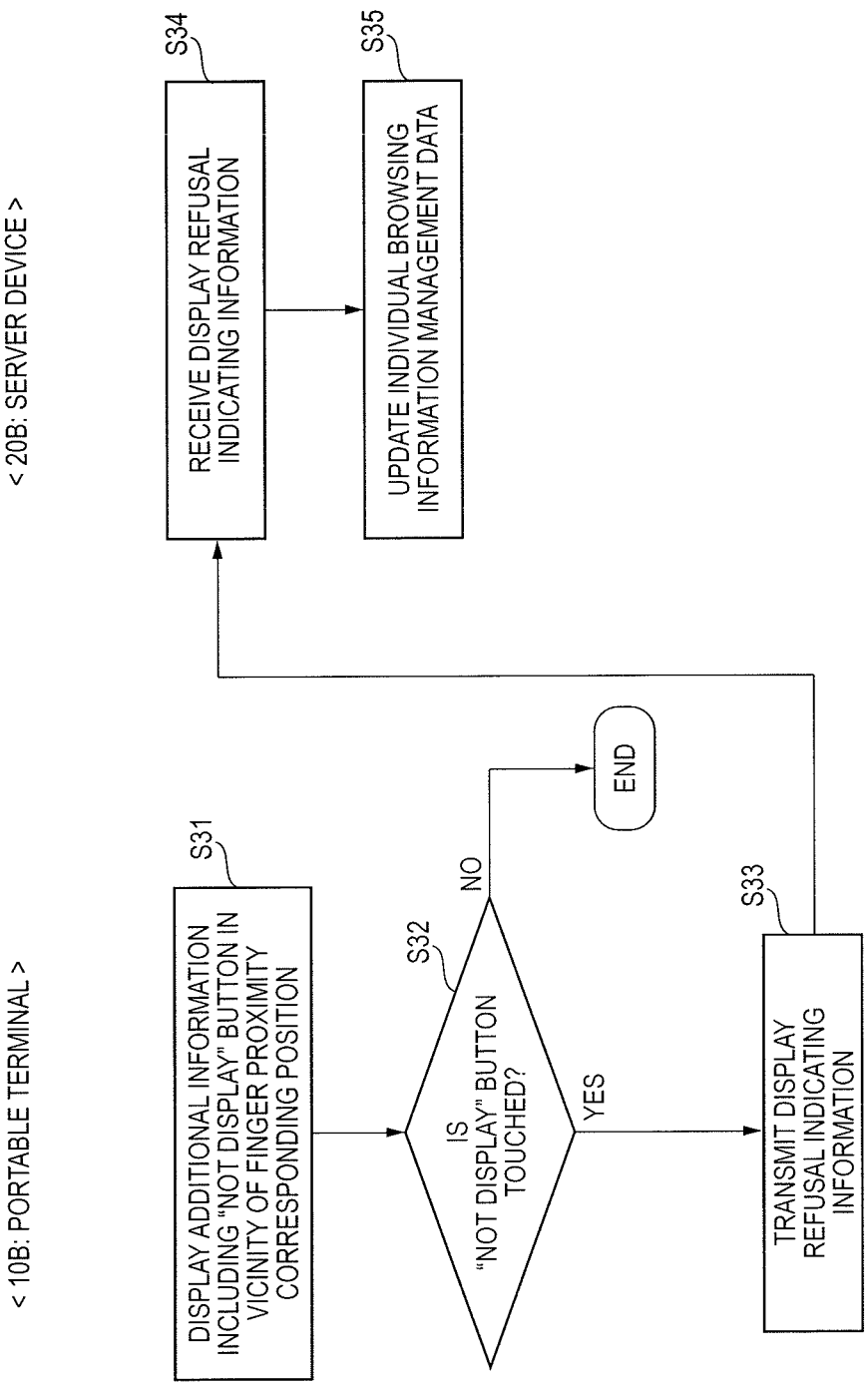
FIG. 10 is a flowchart describing respective operating procedures between a portable terminal 10B and a server device 20B in the third embodiment, when information indicating refusal to the display of additional information ADD for an object is registered.

Next, the operating procedures for the registration of information indicating refusal to the display of the additional information ADD for an object in the information display control system 70 of the third embodiment will be described with reference to FIG. 10. FIG. 10 is a flowchart describing respective operating procedures between the portable terminal 10B and the server device 20B in the third embodiment, when information indicating refusal to the display of additional information ADD for an object is registered.

In addition, the flowchart illustrated in FIG. 10 shows the operations following the step S9 of FIG. 4, and step S10 of FIG. 4 is replaced with step S31 of FIG. 10. Hereinafter, in the description of FIG. 10, respective operations of the portable terminal 10B and the server device 20B will be described in time series, by referring to the details of FIG. 9, as necessary.

In FIG. 10, the information request reception unit 14B receives additional information ADD for an object (see FIG. 2) transmitted from the server device 20B, and outputs the additional information ADD to the application 15B. The application 15B outputs the details of the additional information ADD (see FIG. 2) for an object which is output from the information request reception unit 14B and information indicating the display of the information for confirming whether to reject the display of the details of item "message" of the additional information ADD ("not display" button) to the display control unit 16B.

The display control unit 16B displays the details of item "message" of the additional information ADD of the object which is output from the application 15B and the information for confirming whether to reject the display of the details of item "message" of the additional information ADD ("not display" button), in the vicinity of the proximity corresponding position of the screen DP (S31, see FIG. 9). When the user's finger FG does not touch the "not display" button of the additional information ADD2 illustrated in FIG. 9 (S32, NO), the operation of the flowchart illustrated in FIG. 10 is ended.

When the user's finger FG touches the "not display" button of the additional information ADD2 illustrated in FIG. 9 (S32, YES), the position determination unit 13 calculates information of touch coordinates (x, y) of the finger FG, based on the contact notification which is output from the contact detection unit 12, and generates the information indicating refusal to the display of the additional information ADD of the object "XX restaurant". The position determination unit 13 generates display refusal indicating information including information of the touch coordinates (x, y), information indicating refusal to the display of the additional information ADD of the object "XX restaurant", and identification information of the portable terminal 10B, and outputs the information to the information request reception unit 14B. The information request reception unit 14B transmits the display refusal indicating information which is output from the position determination unit 13 to the server device 20B (S33).

The information input/output unit 21B receives the display refusal indicating information which is transmitted from the information request reception unit 14B, and outputs the information indicating refusal to the display of details of the item "message" of the additional information ADD and the identification information of the portable terminal 10B, among the display refusal indicating information, to the display condition control unit 27 (S34). The display condition control unit 27 registers information indicating refusal to the display of details of the item "message" of the additional information ADD in the individual browsing management information corresponding to the identification information of the portable terminal 10B stored in the individual browsing management information data storage unit 28, based on the information indicating refusal to the display of details of the item "message" of the additional information ADD and the identification information of the portable terminal 10B, which are output from the information input/output unit 21B, and also additionally registers the information of the registration date and time (S35, see FIG. 9).

(Operation of Information Display Control System 70 of the Third Embodiment: After Registration of Information Indicating Refusal to Display)

Figure 11:
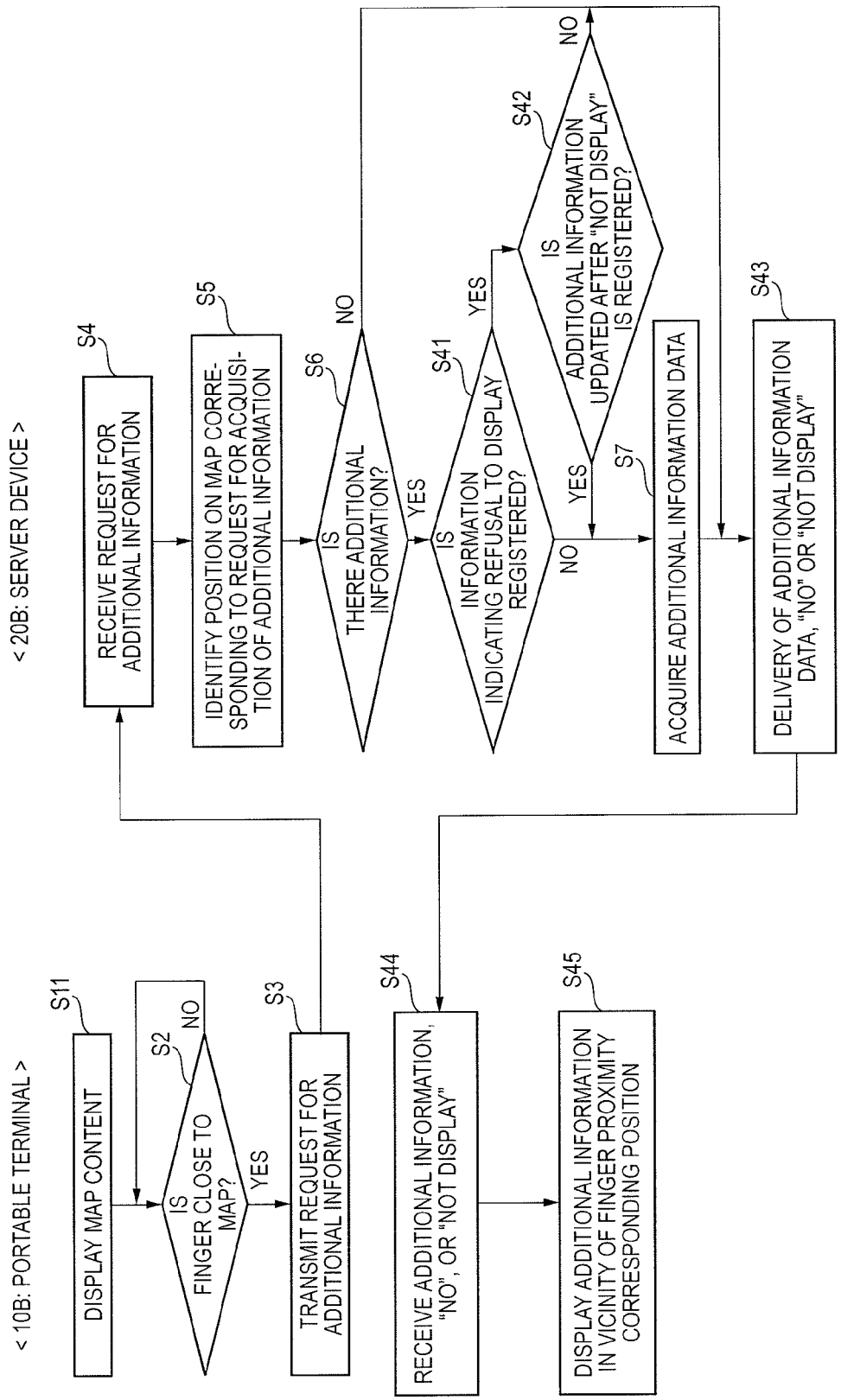
FIG. 11 is a flowchart describing respective operating procedures of the portable terminal 10B and the server device 20B in the third embodiment after the information indicating refusal to the display of additional information ADD of the object is registered.

Next, the operating procedures after the registration of the information indicating refusal to the display of additional information ADD for an object in the information display control system 70 of the third embodiment will be described with reference to FIG. 11. FIG. 11 is a flowchart describing respective operating procedures of the portable terminal 10B and the server device 20B in the third embodiment after the information indicating refusal to the display of additional information ADD of the object is registered.

In addition, in the description of the flowchart illustrated in FIG. 11, description of the same details as the details of FIG. 4 will be omitted, and different details will be described. Hereinafter, in the description of FIG. 11, the details of FIGS. 9 and 3 may be referred to, as necessary.

In FIG. 11, when the additional information control unit 22B extracts the additional information ADD of the corresponding object (S6, YES), the information indicating that the additional information ADD of the corresponding object is extracted is output to the display condition control unit 27. The display condition control unit 27 determines whether or not the information indicating refusal to the display of details of the item "message" of the additional information ADD has been registered in the individual browsing management information corresponding to the identification information of the portable terminal 10B, based on the information which is output from the additional information control unit 22B, the identification information of the portable terminal 10B which is output from the information input/output unit 21B, and the information indicating refusal to the display of details of the item "message" of the additional information ADD, by referring to the individual browsing management information data storage unit 28 (S41).

When it is determined that the information indicating refusal to the display of details of the item "message" of the additional information ADD of the corresponding object has not been registered in the individual browsing management information (S41, NO), the display condition control unit 27 outputs information of the determination result to the additional information control unit 22B. The additional information control unit 22B acquires the additional information ADD extracted in step S6 from the additional information data storage unit 24, based on the information of the determination result indicating that the display refusal indicating information has not been registered in the individual browsing management information (S7).

Meanwhile, when it is determined that the information indicating refusal to the display of details of the item "message" of the additional information ADD of the corresponding object has been registered in the individual browsing management information (S41, YES), the display condition control unit 27 outputs information of registration date and time when display refusal indicating information was registered in the individual browsing management information to the additional information control unit 22B. The additional information control unit 22B determines whether or not the additional information ADD of the corresponding object has been updated by the external terminal 30 (see FIG. 5), after the registration date and time when the display refusal indicating information is registered in the individual browsing management information, based on information of the registration date and time which is output from the display condition control unit 27 (S42).

When it is determined that the additional information ADD of the corresponding object has been updated, for example, by the external terminal 30, after the registration date and time when the display refusal indicating information is registered in the individual browsing management information (S42, YES), the additional information control unit 22B acquires the additional information ADD extracted in step S6 from the additional information data storage unit 24 (S7). In other words, even in the additional information ADD for an object of which display is refused by the user's operation, when the details of the item "message" of the additional information ADD are updated by the user using the external terminal 30 (for example, the owner of "XX restaurant") after the information indicating refusal to the display of the additional information ADD of the corresponding object has been registered in the individual browsing management information, the additional information control unit 22B displays the additional information ADD of the corresponding object on the portable terminal 10B again.

In addition, once the information indicating refusal to the display of the additional information ADD is registered in the individual browsing management information, even if the details of the additional information ADD of the target object are updated by, for example, the external terminal 30, the additional information control unit 22B may determine not to display any of all the additional information ADD of the target object. In this case, the operation subsequent to step S42 of FIG. 11 always proceeds to S43, without passing through step S7.

Meanwhile, the additional information control unit 22B determines that after the registration date and time when the information indicating refusal to the display of the additional information ADD of the target object is registered in the individual browsing management information, the additional information ADD of the corresponding object has not been updated by, for example, the external terminal 30 (S42, NO). In this case, the additional information control unit 22B outputs one of the additional information ADD of the corresponding target object, the information indicating that there is no additional information ADD when the corresponding additional information ADD is not extracted in step S6, and the information of not displaying the corresponding additional information ADD in step S42, similarly to the case when it is determined that there is no additional information ADD of the corresponding target object in step S6 illustrated in FIG. 4, to the information input/output unit 21B.

The information input/output unit 21 delivers (transmits) any information of the additional information ADD of the object in response to the request of the portable terminal 10, the information indicating that there is no corresponding additional information ADD, and the information of not displaying the corresponding additional information ADD to the portable terminal 10 (S43). In addition, while the information input/output unit 21 does not deliver the information indicating that there is no additional information ADD, and the information of not displaying the corresponding additional information ADD, the process may be ended.

The information request reception unit 14B receives any information of the additional information ADD of the object, the information indicating that there is no corresponding additional information ADD, and the information of not displaying the corresponding additional information ADD, which are delivered (transmitted) from the server device 20B, and outputs the information to the application 15B (S44). When the information request reception unit 14B receives the additional information ADD of the object, the application 15B outputs the additional information ADD of the object to the display control unit 16B. The display control unit 16B displays the additional information ADD of the object which is output from the application 15B, in the vicinity of the proximity corresponding position of the screen DP (S45, see the right side of FIG. 3). In addition, when the information request reception unit 14B receives the information of not displaying the corresponding additional information ADD, even when the finger FG is close to, for example, the position of the object "XX restaurant" displayed on the screen DP, the display control unit 16B does not display the additional information ADD (see the left side of FIG. 3).

Thus, in the information display control system 70 of the present embodiment, the portable terminal 10B displays the details of the additional information ADD for an object in the map content displayed at the proximity corresponding position and information for confirming whether to reject the display of the additional information ADD (specifically, "not display" button) on the screen DP. If the user's finger FG touches the "not display" button, the portable terminal 10B transmits the display refusal indicating information including the information of refusing the display of the additional information ADD of the corresponding object, to the server device 20B.

When the display refusal indicating information from the portable terminal 10B is received, the server device 20B registers information of not displaying the additional information ADD of the corresponding object in the individual browsing management information corresponding to the identification number of the portable terminal 10B among the display refusal indicating information.

Thus, in the information display control system 70, after the information indicating refusal to the display of details of the item "message" of the additional information ADD is registered in the individual browsing management information corresponding to the identification number of the portable terminal 10B, the portable terminal 10B does not display the additional information ADD of the corresponding object on the screen DP, and thus for example, even when the user erroneously moves the finger FG close to an object in which the user is not interested, it is possible to prevent the display of the additional information ADD of the object.

The above has described various embodiments with reference to the drawings, but the present invention is not limited to the embodiments. It is apparent that a person skilled in the art can conceive changes and modifications to various embodiments and combinations of various embodiments within the scope of the appended claims, and it is understood that they belong to the technical scope of the present invention as a matter of course.

In the third embodiment, the identification number of the portable terminal 10B included in the display refusal indicating information may be a user ID for identifying user information of the portable terminal 10B, or number information of a subscriber identity module (SIM) card. In particular, since one user may possess a plurality of portable terminals (for example, a smart phone and a tablet terminal) in some cases, if for example, the user ID is included in the display refusal indicating information, even when the same user uses the smart phone or even if the user uses the tablet terminal, it is possible to reject the display of the same additional information ADD for an object, and thus user operability is improved.

In the third embodiment, the individual browsing management information stored in the individual browsing management information data storage unit 28 may further include information of a display category of an object corresponding to the preference of the user or an object which the user does not like to be displayed, for each user or each identification number of the portable terminal 10B. Although not shown, for example, in the individual browsing management information data storage unit 28 of FIG. 9, it is assumed that the individual browsing management information corresponding to ID "123123" stored in the individual browsing management information data storage unit 28 includes information of "restaurant, sushi" for a display category of an object corresponding to the preference of the user.

In other words, when the individual browsing management information includes the information "restaurant, sushi" for a display category of an object corresponding to the preference of the user, even if the user moves the finger FG close to the object, on the portable terminal corresponding to the ID of the individual browsing management information, the additional information ADD of only an object including additional information for the display category "restaurant, sushi" is displayed.

Accordingly, as described in the first embodiment, when the user's finger FG is close to the object in the map content, the server device 20B transmits additional information data of the additional information ADD for an object to the portable terminal 10B, in response to the request for the additional information ADD for an object from the portable terminal 10B, only if the display category "restaurant, sushi" has been registered in the individual browsing management information corresponding to the identification number of the portable terminal 10B. The portable terminal 10B displays a pop-up window MSG displaying the details of item "message" of the additional information ADD, at the proximity corresponding position on the screen DP, by using the additional information data which is transmitted from the server device 20B.

Thus, the portable terminal 10B is capable of displaying only the details of the additional information ADD including information of a display category of an object corresponding to the preference of the user, or is capable of comfortably performing the user's operation, without displaying only the details of the additional information ADD including the display category information that the user does not like to be displayed.

The present application is based on Japanese patent application No. 2012-163929 filed on Jul. 24, 2012, the contents of which are incorporated herein by reference.

INDUSTRIAL APPLICABILITY

The present invention is useful as a portable terminal, an information display control method and an information display control system, which are capable of displaying additional information for an object of content that is displayed at a position on a screen to which the proximity of a physical object is detected, in the vicinity of the position, thereby improving user operability.

REFERENCE SIGNS LIST 10, 10B: portable terminal
11: proximity detection unit
12: contact detection unit
13: position determination unit
14: information request reception unit
15: application
16: display control unit
17: screen display unit
18, 29 RAM
20, 20A, 20B: server device
21: information input/output unit
22: additional information control unit
23: map data storage unit
24: additional information data storage unit
25: additional information update receiving unit
26: update permission terminal information data storage unit
27: display condition control unit
28: individual browsing management information data storage unit
50, 60, 70: information display control system

The invention claimed is:
1. A server and terminal system, comprising:
a server comprising:
an interface configured to communicate with a terminal; and
a storage; and
the terminal comprising:
a screen configured to display at least one object;
a detector configured to detect contact of a physical object to the screen and a contact position, which is a position on the screen of the physical object when the contact is detected, and configured to detect contactless proximity of the physical object to the screen and a proximity position, which is a position on the screen corresponding to the physical object when the contactless proximity is detected; and an interface configured to communicate with the server, the server being distinct from the terminal, wherein the screen of the terminal is configured to display first information, when the detector of the terminal detects the contact of the physical object to the screen and the contact position corresponds to one of the at least one object on the screen, the screen of the terminal is configured to display second information different from the first information, when the detector of the terminal detects the contactless proximity of the physical object to the screen and the proximity position corresponds to the one of the at least one object on the screen, while the screen of the terminal displays the one of the at least one object, when the detector of the terminal detects the contactless proximity of the physical object to the screen and the proximity position corresponds to the one of the at least one object on the screen, the interface of the terminal sends first digital data to the server distinct from the terminal, the first digital data requesting second information for the object, when the interface of the server receives the first digital data from the terminal, the interface of the server sends second digital data to the terminal distinct from the server, the second digital data indicating the second information stored in the storage of the server, when the interface of the terminal receives the second digital data from the server, the screen of the terminal displays the second information for the one of the at least one object, and the storage of the server stores the second information for the one of the at least one object in association with detection of the contactless proximity of the physical object to the screen of the terminal.

2. The server and terminal system according to the claim 1,
wherein the storage of the server further stores the first information for the one of the at least one object in association with detection of the contact of the physical object to the screen.

3. The server and terminal system according to the claim 2,
wherein, when the detector detects the contact of the physical object to the screen and the contact position corresponds to the position of the one of the at least one object, the display displays the first information stored in the storage of the server.

4. The server and terminal system according to the claim 1,
wherein, when the interface of the terminal receives the second digital data from the server, the screen displays the one of the at least one object and the second information for the one of the at least one object.

5. The server and terminal system according to claim 1, wherein the second information stored in the storage is updatable.

6. The server and terminal system according to claim 5, wherein, when the interface of the server receives third digital data requesting update of the second information, the second information stored in the storage of the server is updated.

7. The server and terminal system according to claim 6, wherein, when the interface of the server receives the third digital data requesting update of the second information and including third information, the second information stored in the storage of the server is updated to the third information.

8. The server and terminal system according to claim 7, wherein
the terminal is defined as a first terminal,
the server and terminal system further comprises a second terminal, and
when the interface of the server receives the third digital data requesting update of the second information and including the third information, from the second terminal, the second information stored in the storage is updated to the third information.

9. The server and terminal system according to claim 1, wherein, when the interface of the terminal receives the second digital data from the server, the screen displays the second information for the one of the at least one object and third information to stop displaying the second information.

10. The server and terminal system according to claim 9, wherein
the third information comprises an icon, and
when the icon of the third information is selected, the interface of the server stops sending the second information.

11. The server and terminal system according to claim 10, wherein, after the interface of the server stops sending the second information, when the second information stored in the storage is updated, the interface of the server sends updated second information.

12. A server comprising:
an interface configured to communicate with a terminal; and
a storage,
wherein the terminal comprises:
a screen configured to display at least one object;
a detector configured to detect contact of a physical object to the screen and a contact position, which is a position on the screen of the physical object when the contact is detected, and configured to detect contactless proximity of the physical object to the screen and a proximity position, which is a position on the screen corresponding to the physical object when the contactless proximity is detected; and
an interface configured to communicate with the server, the server being distinct from the terminal,
the screen of the terminal is configured to display first information, when the detector of the terminal detects the contact of the physical object to the screen and the contact position corresponds to one of the at least one object on the screen,
the screen of the terminal is configured to display second information different from the first information, when the detector of the terminal detects the contactless proximity of the physical object to the screen and the proximity position corresponds to the one of the at least one object on the screen,
while the screen of the terminal displays the one of the at least one object, when the detector of the terminal detects the contactless proximity of the physical object to the screen and the proximity position corresponds to the one of the at least one object on the screen, the interface of the terminal sends first digital data to the server distinct from the terminal, the first digital data requesting second information for the object,
when the interface of the server receives the first digital data from the terminal, the interface of the server sends second digital data to the terminal distinct from the server, the second digital data indicating the second information stored in the storage of the server, when the interface of the terminal receives the second digital data from the server, the screen of the terminal displays the second information for the one of the at least one object, and the storage of the server stores the second information for the one of the at least one object in association with detection of the contactless proximity of the physical object to the screen of the terminal.

13. The server according to the claim 12, wherein the storage of the server further stores the first information for the one of the at least one object in association with detection of the contact of the physical object to the screen.

14. The server according to the claim 13, wherein, when the detector detects the contact of the physical object to the screen and the contact position corresponds to the position of the one of the at least one object, the display displays the first information stored in the storage of the server.

15. The server according to the claim 12, wherein, when the interface of the terminal receives the second digital data from the server, the screen displays the one of the at least one object and the second information for the one of the at least one object.

16. The server according to claim 12, wherein the second information stored in the storage is updatable.

17. The server according to claim 16, wherein, when the interface of the server receives third digital data requesting update of the second information, the second information stored in the storage of the server is updated.

18. The server according to claim 17, wherein, when the interface of the server receives the third digital data requesting update of the second information and including third information, the second information stored in the storage of the server is updated to the third information.

19. A control method for a server and terminal system, the sever and terminal system comprising:

a server comprising an interface configured to communicate with a terminal; and a storage, the terminal comprising:

a screen configured to display at least one object;

a detector configured to detect contact of a physical object to the screen and a contact position, which is a position on the screen of the physical object when the contact is detected, and configured to detect contactless proximity of the physical object to the screen and a proximity position, which is a position on the screen corresponding to the physical object when the contactless proximity is detected; and an interface configured to communicate with the server, the server being distinct from the terminal, and the method comprising:

detecting, by the detector, contact of the physical object to the screen and the contact position corresponding to one of the at least one object on the screen;

displaying first information on the screen, when the detector detects the contact of the physical object to the screen and the contact position corresponds to the one of the at least one object on the screen;

detecting, by the detector while the screen of the terminal displays the one of the at least one object, contactless proximity of the physical object to the screen and the proximity position corresponding to the one of the at least one object on the screen;

sending, by the interface of the terminal to the server distinct from the server, first digital data requesting second information for the object, when the detector detects the contactless proximity of the physical object to the screen and the proximity position corresponds to the one of the at least one object on the screen, the second information being different from the first information, sending, by the interface of the server to the terminal distinct from the server, second digital data indicating the second information stored in the storage of the server, when the interface of the server receives the first digital data from the terminal; and displaying, on the screen of the terminal, the second information for the one of the at least one object, when the interface of the terminal receives the second digital data from the server, wherein the storage of the server stores the second information for the one of the at least one object in association with detection of the contactless proximity of the physical object to the screen of the terminal.

* * * * *